United States Patent
Ruth et al.

(10) Patent No.: US 6,725,230 B2
(45) Date of Patent: Apr. 20, 2004

(54) SYSTEM, METHOD AND COMPUTER PROGRAM FOR ASSEMBLING PROCESS DATA OF MULTI-DATABASE ORIGINS USING A HIERARCHICAL DISPLAY

(75) Inventors: Joseph D. Ruth, Longmont, CO (US); Susan A. Dorr, Louisville, CO (US); Nick Galemmo, Stevenson Ranch, CA (US); Jeffrey A. Junak, Lafayette, CO (US); Olivier Libouban, Lafayette, CO (US); Justin A. Neway, Longmont, CO (US)

(73) Assignee: Aegis Analytical Corporation, Lafayette, CO (US)

( * ) Notice: Subject to any disclaimer, the term of this patent is extended or adjusted under 35 U.S.C. 154(b) by 17 days.

(21) Appl. No.: 09/816,547

(22) Filed: Mar. 26, 2001

(65) Prior Publication Data

US 2002/0059003 A1 May 16, 2002

Related U.S. Application Data

(60) Provisional application No. 60/219,463, filed on Jul. 18, 2000.

(51) Int. Cl.[7] ............................................. G06F 17/30
(52) U.S. Cl. ................. 707/102; 707/10; 707/104.1; 715/500.1
(58) Field of Search ............................... 707/3, 102, 10, 707/104.1; 345/853, 854; 702/14, 19, 30, 184; 706/1, 45; 712/13, 14, 17; 715/500.1

(56) References Cited

U.S. PATENT DOCUMENTS

| 5,428,357 A | * | 6/1995 | Haab et al. ................. 341/155 |
| 5,701,400 A | * | 12/1997 | Amado ........................ 706/45 |
| 5,920,828 A | * | 7/1999 | Norris et al. .................. 702/14 |
| 5,978,804 A | * | 11/1999 | Dietzman ..................... 707/10 |
| 6,014,661 A | | 1/2000 | Ahlberg |
| 6,023,659 A | * | 2/2000 | Seilhamer et al. ............. 702/19 |
| 6,046,742 A | | 4/2000 | Chari |
| 6,076,080 A | * | 6/2000 | Morscheck et al. ......... 705/400 |
| 6,141,647 A | * | 10/2000 | Meijer et al. .................. 705/1 |
| 6,178,382 B1 | * | 1/2001 | Roederer et al. ............. 702/21 |
| 6,185,561 B1 | * | 2/2001 | Balaban et al. ................ 707/6 |
| 6,205,533 B1 | * | 3/2001 | Margolus ..................... 712/13 |

FOREIGN PATENT DOCUMENTS

WO    WO 9710365 A1  *  3/1997  ............ C12Q/1/68

OTHER PUBLICATIONS

Christopher Ahlberg, "Visual Exploration of FITS Databases: Bridging 1–98 the gap between chemistry and biology", Drug Discovery Today, Aug. 1999, vol. 4, No. 8, pp. 370–376, specifically pages p. 372, col. 2, pp. 373–374, Figure 8.

* cited by examiner

Primary Examiner—Shahid Al Alam
(74) Attorney, Agent, or Firm—Jagtiani + Guttag

(57) ABSTRACT

The present invention provides a method for analyzing a process based on displaying data to a user from a plurality of different sources and a machine-readable medium for implementing such a method. The present invention also provides a mapping system and a method for displaying data to a user employing a hierarchy including data nodes and data leaves.

98 Claims, 27 Drawing Sheets

MATRIX

| Primary Data Set Type | Secondary Data Set Type | Tertiary Data Set Type |
|---|---|---|
| Discrete Data Set | - | Non-Replicate Data Set |
| Horizontally Continuous Data Set | Coded Pair Data Set | Vertical Replicate Data Set |
| Vertically Continuous Data Set | Simple Value Data Set | Horizontal Replicate Data Set |

FIG. 8A

Discrete/Coded-Pair/Non-Replicate

| Batch # | Test Name | Value |
|---|---|---|
| 1 | Potency | 37 |
| 1 | Granule Size | 0.157 |
| 1 | Contaminants | 0.0153 |
| 2 | Weight | 13.35 |
| 2 | Density | 1.395 |

FIG. 8B

Discrete/Coded-Pair/H. Replicate

| Batch # | Test Name | Value 1 | Value 2 | Value 3 |
|---|---|---|---|---|
| 1 | Potency | 37 | 39 | 38 |
| 2 | Potency | 29 | 32 | 28 |
| 1 | Granule Size | 0.157 | 0.162 | 0.158 |

FIG. 8C

Discrete/Coded-Pair/V. Replicate

| Batch # | Test Name | Test # | Value |
|---|---|---|---|
| 1 | Potency | 1 | 37 |
| 1 | Potency | 2 | 29 |
| 1 | Potency | 3 | 38 |
| 2 | Granule Size | 1 | 29 |
| 2 | Granule Size | 2 | 32 |

FIG. 8D

Discrete/Simple/Non-Replicate

| Batch # | Potency | Granule Size | Contamination |
|---|---|---|---|
| 1 | 37 | 0.153 | 0.0123 |
| 2 | 36 | 0.148 | 0.0120 |
| 3 | 39 | 0.151 | 0.0129 |

FIG. 8E

Discrete/Simple/H. Replicate

| Batch # | Potency 1 | Potency 2 | Potency 3 |
|---|---|---|---|
| 1 | 37 | 39 | 38 |
| 2 | 35 | 39 | 36 |
| 3 | 36 | 36 | 38 |

FIG. 8F

Discrete/Simple/V. Replicate

| Batch # | Potency | Test # |
|---|---|---|
| 1 | 37 | 1 |
| 1 | 39 | 2 |
| 1 | 38 | 3 |
| 2 | 35 | 1 |
| 2 | 39 | 2 |

FIG. 8G

H. Continuous/Simple/Non-Replicate

| Batch # | Temp. @ Time 0 | Temp. @ Time 5 | Temp. @ Time 10 | Temp. @ Time 15 |
|---|---|---|---|---|
| 1 | 37.2 | 38.4 | 39.5 | 40.2 |
| 2 | 33.6 | 38.5 | 42.0 | 45.3 |
| 3 | 34.5 | 34.6 | 34.7 | 35.2 |

FIG. 8H

H. Continuous/Coded-Pair/Non-Replicate

| Batch # | Test Name | Value @ Time 0 | Value @ Time 5 | Value @ Time 10 | Value @ Time 15 |
|---|---|---|---|---|---|
| 1 | Temperature | 37.2 | 38.4 | 42.3 | 45 |
| 1 | RPM | 3763 | 3772 | 3795 | 3793 |

FIG. 8I

H. Continuous/Coded-Pair/H. Replicate

| Batch # | Test Name | Val 1 @ Time 0 | Val 2 @ Time 0 | Val 1 @ Time 5 | Val 2 @ Time 5 | Val 1 @ Time 10 | Val 2 @ Time 10 |
|---|---|---|---|---|---|---|---|
| 1 | Temperature | 37.2 | 37.3 | 38.4 | 38.4 | 39.2 | 39.3 |
| 1 | Temperature | 38.4 | 38.4 | 39.2 | 39.2 | 41.3 | 41.4 |
| 1 | Granule | .157 | .157 | .163 | .162 | .164 | .163 |

FIG. 8J

H. Continuous/Simple/H. Replicate

| Batch # | Temp 1 @ Time 0 | Temp 2 @ Time 0 | Temp 1 @ Time 5 | Temp 2 @ Time 5 | Temp 1 @ Time 10 | Temp 2 @ Time 10 |
|---|---|---|---|---|---|---|
| 1 | 37.2 | 37.2 | 38.3 | 38.2 | 39.7 | 39.7 |
| 2 | 33.4 | 33.5 | 39.6 | 39.8 | 43.4 | 43.3 |
| 3 | 37.5 | 37.5 | 38.4 | 38.4 | 38.7 | 38.6 |

FIG. 8K

H. Continuous/Simple/V. Replicate

| Batch # | Test # | Value @ Time 0 | Value @ Time 5 | Value @ Time 10 | Value @ Time 15 |
|---|---|---|---|---|---|
| 1 | 1 | 37.2 | 38.4 | 39.3 | 42.5 |
| 1 | 2 | 37.2 | 38.3 | 39.5 | 41.9 |
| 1 | 3 | 37.2 | 38.4 | 37.4 | 42.1 |

FIG. 8L

H. Continuous/Coded-Pair/V. Replicate

| Batch # | Test Name | Test # | Value @ Time 0 | Value @ Time 5 | Value @ Time 10 | Value @ Time 15 |
|---|---|---|---|---|---|---|
| 1 | Temperature | 1 | 37.2 | 38.4 | 39.6 | 42.5 |
| 1 | Temperature | 2 | 37.2 | 38.3 | 39.6 | 42.4 |
| 1 | Temperature | 3 | 37.3 | 38.3 | 39.6 | 42.3 |

FIG. 8M

V. Continuous/Coded-Pair/Non-Replicate

| Batch # | Time | Test Name | Value |
|---|---|---|---|
| 1 | 0 | Temperature | 37.2 |
| 1 | 5 | Temperature | 38.4 |
| 1 | 10 | Temperature | 39.3 |
| 1 | 15 | Temperature | 42.0 |

FIG. 8N

V. Continuous/Simple/Non-Replicate

| Batch # | Time | Temperature | RPM |
|---|---|---|---|
| 1 | 0 | 37.2 | 3815 |
| 1 | 5 | 38.4 | 3912 |
| 1 | 10 | 39.5 | 3878 |
| 1 | 15 | 42.0 | 3903 |

FIG. 8O

V. Continuous/Coded-Pair/H. Replicate

| Batch # | Time | Test Name | Value 1 | Value 2 | Value 3 |
|---|---|---|---|---|---|
| 1 | 0 | Temperature | 37.2 | 38.1 | 37.4 |
| 1 | 5 | Temperature | 38.4 | 38.4 | 38.3 |
| 1 | 10 | Temperature | 39.6 | 39.5 | 39.6 |

FIG. 8P

V. Continuous/Simple/H. Replicate

| Batch # | Time | Temp 1 | Temp 2 | Temp 3 |
|---|---|---|---|---|
| 1 | 0 | 37.2 | 37.3 | 37.2 |
| 1 | 5 | 38.4 | 38.5 | 38.4 |
| 1 | 10 | 39.6 | 39.5 | 39.6 |
| 1 | 15 | 42.3 | 42.4 | 42.3 |

FIG. 8Q

V. Continuous/Coded-Pair/V. Replicate

| Batch # | Test Name | Time | Test # | Value |
|---|---|---|---|---|
| 1 | Temperature | 0 | 1 | 37.2 |
| 1 | Temperature | 0 | 2 | 37.2 |
| 1 | Temperature | 0 | 3 | 37.3 |
| 1 | Temperature | 5 | 1 | 38.4 |
| 1 | Temperature | 5 | 2 | 38.5 |

FIG. 8R

V. Continuous/Simple/V. Replicate

| Batch # | Time | Test # | Temperature | RPM |
|---|---|---|---|---|
| 1 | 0 | 1 | 37.2 | 3654 |
| 1 | 0 | 2 | 37.3 | 3654 |
| 1 | 0 | 3 | 37.2 | 3656 |
| 1 | 5 | 1 | 38.4 | 3685 |
| 1 | 5 | 2 | 38.3 | 3684 |
| 1 | 5 | 3 | 38.4 | 3685 |

| Hierarchy Description | | | | | | | | | Alias | Data Location | |
|---|---|---|---|---|---|---|---|---|---|---|---|
| Level | | | | | | | | | | Label/Data | System Table |
| 1 | 2 | 3 | 4 | 5 | 6 | 7 | 8 | | | | |
| 1 | FORMULA TEMPLATE ROW | | | | | | | | | Data | |
| 2 | | | | | | | | | | | |
| 3 | Plant X | | | | | | | | USA | Label | N/A | N/A |
| 4 | | Pills | | | | | | | Prod | Label | N/A | N/A |
| 5 | | | Product Family Y | | | | | | Y | Label | N/A | N/A |
| 6 | | | | Product 1 | | | | | Y60mg | Data | erp | tabl |
| 7 | | | | | Dispensing | | | | Disp | Label | N/A | N/A |
| 8 | | | | | | Active Ingredient | | | AI | Data | erp | tabl |
| 9 | | | | | | | Lot Number | | Lot | Data | erp | tabl |
| 10 | | | | | | | Weight | | Weight | Data | erp | tabl |
| 11 | | | | | | | Powder Fineness, Percent | | PF_% | Data | lims | results |
| 12 | | | | | | | Powder Fineness, 100-R1 | | PF_100-R1_% | Data | lims | results |
| 13 | | | | | | | Specific Surface Area | | SSA | Data | lims | results |
| 14 | | | | | | | DSC Temperature | | DSC_Temp_C | Data | lims | results |
| 15 | | | | | | | Water | | H20_% | Data | lims | results |
| 16 | | | | | | | Assay | | ASY_% | Data | lims | results |
| 17 | | | | | | | Avg Assay | | ASY_% | Data | lims | results |
| 18 | | | | | | | Number | | % | Data | lims | results |

FIG. 20B

| | Value Column | Code Pair | First Code Column | First Code Value | Second Code Column | Second Code Column Value | Third Code Column |
|---|---|---|---|---|---|---|---|
| 1 | | | N/A | N/A | N/A | N/A | N/A |
| 2 | | | | | | | |
| 3 | N/A | N/A | N/A | N/A | N/A | N/A | N/A |
| 4 | N/A | N/A | N/A | N/A | N/A | N/A | N/A |
| 5 | N/A | N/A | N/A | N/A | N/A | N/A | N/A |
| 6 | ord | no | N/A | N/A | N/A | N/A | N/A |
| 7 | N/A | N/A | N/A | N/A | N/A | N/A | N/A |
| 8 | mat | no | N/A | N/A | N/A | N/A | N/A |
| 9 | batch | no | N/A | N/A | N/A | N/A | N/A |
| 10 | stk | no | N/A | N/A | N/A | N/A | N/A |
| 11 | number_value | 3 | componentPOWDER | FINENESS | measureNUMBER | measureNUMBER | units |
| 12 | number_value | 3 | componentPOWDER | FINENESS | measure100-R1 | measure100-R1 | units |
| 13 | number_value | 3 | componentSPECIFIC | SURFACE AREA | measureNUMBER | measureNUMBER | units |
| 14 | number_value | 3 | componentDSC | | measureTEMPERATURE | measureTEMPERATURE | units |
| 15 | number_value | 3 | componentWATER | | measureNUMBER | measureNUMBER | units |
| 16 | number_value | 3 | componentAl | | measureASSAY | measureASSAY | units |
| 17 | number_value | 3 | componentAl AVG | | measureASSAY AVG | measureASSAY AVG | units |
| 18 | number_value | 3 | componentAl | | measureASSAY | measureASSAY | units |

FIG. 20C

| | Third Code Value Values | Data Description Data Type | Discrete/Continuous |
|---|---|---|---|
| 1 | N/A | String | N/A |
| 2 | | | |
| 3 | N/A | N/A | N/A |
| 4 | N/A | N/A | N/A |
| 5 | N/A | N/A | N/A |
| 6 | N/A | 13-23, 14-23, 15-23 | String | N/A |
| 7 | N/A | N/A | N/A |
| 8 | N/A | 39-296 | String | N/A |
| 9 | N/A | String | N/A |
| 10 | N/A | Number | Discrete |
| 11 | % | Number | Discrete |
| 12 | % | Number | Discrete |
| 13 | square meters/g | Number | Discrete |
| 14 | Degrees Celsius | Number | Discrete |
| 15 | % | Number | Discrete |
| 16 | % | Number | Discrete |
| 17 | % | Number | Discrete |
| 18 | % | Number | Discrete |

FIG. 20D

Hierarchy Description

| Level | | | | | | | | | Alias | Data Location | | |
|---|---|---|---|---|---|---|---|---|---|---|---|---|
| 1 | 2 | 3 | 4 | 5 | 6 | 7 | 8 | | | Label/Data System Table | | |
| 19 | | | | | Microcrystalline Cellulose | | | Cell | Data | erp | tabl |
| 20 | | | | | | Lot Number | | Lot | Data | erp | tabl |
| 21 | | | | | | Weight | | Weight | Data | erp | tabl |
| 22 | | | | | | Pct on 60 Mesh | | 60Mesh_% | Data | lims | results |
| 23 | | | | | | Pct on 200 Mesh | | 200Mesh_% | Data | lims | results |
| 24 | | | | | | pH | | pH | Data | lims | results |
| 25 | | | | | | Loss on Drying | | LossOnDry_% | Data | lims | results |
| 26 | | | | | | Bulk Density | | BulkDens_g/mL | Data | lims | results |
| 27 | | | | | | Total Aerobic Microbial Count | | AeroMicro_Count/g | Data | lims | results |
| 28 | | | | | | Total Combined Mold & Yeast Count | | Mold&Yeast_Count/g | Data | lims | results |
| 29 | | | | | Lactose | | | Lact | Data | erp | tabl |
| 30 | | | | | | Lot Number | | Lot | Data | erp | tabl |
| 31 | | | | | | Weight | | Weight | Data | erp | tabl |
| 32 | | | | | Starch | | | Starch | Data | erp | tabl |
| 33 | | | | | | Lot Number | | Lot | Data | erp | tabl |
| 34 | | | | | | Weight | | Weight | Data | erp | tabl |

FIG. 20E

| Value Column | Code Pair Column | First Code First Code Column | First Code Value | Second Code Column |
|---|---|---|---|---|
| 19 mat | no | N/A | N/A | N/A |
| 20 batch | no | N/A | N/A | N/A |
| 21 stk | no | N/A | N/A | N/A |
| 22 number_value | 3 | component | % ON 60 MESH | measure |
| 23 number_value | 3 | component | % ON 200 MESH | measure |
| 24 number_value | 3 | component | PH | measure |
| 25 number_value | 3 | component | LOSS ON DRYING | measure |
| 26 number_value | 3 | component | BULK DENSITY | measure |
| 27 number_value | 3 | component | TOTAL AEROBIC MICROBIAL COUNT | measure |
| 28 number_value | 3 | component | TOTAL COMBINED MOLD & YEAST COUNT | measure |
| 29 mat | no | N/A | N/A | N/A |
| 30 batch | no | N/A | N/A | N/A |
| 31 stk | no | N/A | N/A | N/A |
| 32 mat | no | N/A | N/A | N/A |
| 33 batch | no | N/A | N/A | N/A |
| 34 stk | no | N/A | N/A | N/A |

FIG. 20F

| | Second Code Value | Third Code Column | Data Description Data Type | Discrete/Continuous |
|---|---|---|---|---|
| 19 | N/A | N/A | String | N/A |
| 20 | N/A | N/A | String | N/A |
| 21 | N/A | N/A | Number | Discrete |
| 22 | NUMBER | units | Number | Discrete |
| 23 | NUMBER | units | Number | Discrete |
| 24 | NUMBER | units | Number | Discrete |
| 25 | NUMBER | units | Number | Discrete |
| 26 | NUMBER | units | Number | Discrete |
| 27 | MICRO COUNT | units | Number | Discrete |
| 28 | MICRO COUNT | units | Number | Discrete |
| 29 | N/A | N/A | String | N/A |
| 30 | N/A | N/A | String | N/A |
| 31 | N/A | N/A | Number | Discrete |
| 32 | N/A | N/A | String | N/A |
| 33 | N/A | N/A | String | N/A |
| 34 | N/A | N/A | Number | Discrete |

SYSTEM, METHOD AND COMPUTER PROGRAM FOR ASSEMBLING PROCESS DATA OF MULTI-DATABASE ORIGINS USING A HIERARCHICAL DISPLAY

CROSS-REFERENCE TO RELATED APPLICATIONS

This application makes reference to co-pending U.S. Provisional Patent Application No. 60/219,463 entitled "System, Method and Computer Program Product for Mapping Data of Multi-Database Origins" filed Jul. 18, 2000, and co-pending U.S. patent application Ser. No. 09/392,928 filed on Sep. 9, 1999, the entire contents and disclosures of which are hereby incorporated by reference.

BACKGROUND OF THE INVENTION

1. Field of the Invention

The present invention relates, in general, to data mapping software and methods for mapping data from a plurality of different data sources.

2. Description of the Prior Art

In complex processes such as manufacturing, data may be collected throughout various steps of the manufacturing process. The type of data collected usually relates to various characteristics or parameters of the process. In some highly complex processes, often times hundreds or thousands of pieces of data are collected at various times. The data is then stored in different databases or distributed throughout various locations. However, it is generally difficult for users to access and analyze the data stored in multiple and various data sources.

Conventionally, users generally have to manually locate, extract and format desired data from different sources. For instance, if a user were desirous of tracking the temperature of a mixture to the resulting viscosity of the mixture, the user would generally be required to manually associate these two pieces of data as desired. Each time the user needs to analyze data, they generally must repeat this manual process based on their knowledge of the relationship between the various data sets and the format required for the data analysis. This manual process can be time consuming, cumbersome and highly error prone.

Accordingly, a system and method is needed for mapping preexisting data from disparate data sources regarding various processes or characteristics of an overall process. It is against this background that various embodiments of the present invention were developed.

SUMMARY OF THE INVENTION

It is therefore an object of the present invention to provide method for analyzing processes such as manufacturing processes, synthesis processes and inventory tracking processes that may employ data from different sources.

It is another object of the present invention to provide a method for analyzing processes such as manufacturing processes, synthesis processes and inventory tracking processes that allow discrete, replicate and continuous data to be displayed concurrently to a user and used concurrently by a user.

According to first broad aspect of the present invention, there is provided a method for accessing, displaying and analyzing, a process comprising: providing at least one discrete data set comprising discrete data about at least one first step of the process; providing at least one continuous data set comprising continuous data about at least one second step of the process; grouping the discrete data and the continuous data into analysis group data based on at least one identification code and at least one parameter value of the discrete data and the continuous data; and displaying particular data about the process based on the analysis group data, wherein the displayed data is based on original data from at least two different data sources.

According to a second broad aspect of the present invention there is provided a machine readable medium having stored thereon sequences of instructions, which when executed by one or more processors, cause one or more electronic devices to perform a set of operations comprising: providing at least one discrete data set comprising discrete data about at least one first step of the process; providing at least one continuous data set comprising continuous data about at least one second step of the process; grouping the discrete data and the continuous data into analysis group data based on at least one identification code and at least one parameter value of the discrete data and the continuous data; and displaying displayed data on a visual display device about the process based on the analysis group data, wherein the displayed data is based on original data from at least two different data sources.

According to a third broad aspect of the present invention there is provided a database mapping system comprising: data nodes; and data leaves, wherein the data nodes and the data leaves are organized in a hierarchy and wherein each of the data leaves is associated with at least one of the data nodes and wherein the data leaves represent data for a process.

According to a fourth broad aspect of the present invention, there is provided a database mapping system comprising: data nodes; and data leaves, wherein the data nodes and the data leaves are organized in a hierarchy and wherein each of the data leaves is associated with at least one of the data nodes and wherein the data leaves represent data from different data sources.

According to a fifth broad aspect of the present invention there is provided a method for displaying data to a user comprising: providing data nodes and data leaves; organizing the data nodes and the data leaves into a hierarchy wherein each of the data leaves is associated with at least one of the data nodes; storing data for a process in the data leaves; and displaying at least some of the stored process data to the user on a visual display apparatus.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 8A illustrates a discrete coded-pair non-replicate data set of one of the classifications of the matrix of FIG. 4A, in accordance with one embodiment of the present invention;

FIG. 8B illustrates a discrete coded-pair horizontally replicate data set of one of the classifications of the matrix of FIG. 4A, in accordance with one embodiment of the present invention;

FIG. 8C illustrates a discrete code-pair vertically replicate data set of one of the classifications of the matrix of FIG. 4A, in accordance with one embodiment of the present invention;

FIG. 8D illustrates a discrete simple non-replicate data set of one of the classifications of the matrix of FIG. 4A, in accordance with one embodiment of the present invention;

FIG. 8E illustrates a discrete simple horizontally replicate data set of one of the classifications of the matrix of FIG. 4A, in accordance with one embodiment of the present invention;

FIG. 8F illustrates a discrete simple vertically replicate data set.

FIG. 8G illustrates a horizontally continuous simple non-replicate data set of one of the classifications of the matrix of FIG. 4A, in accordance with one embodiment of the present invention;

FIG. 8H illustrates a horizontally continuous coded-pair non-replicate data set of one of the classifications of the matrix of FIG. 4A, in accordance with one embodiment of the present invention;

FIG. 8I illustrates a horizontally continuous coded-pair horizontally replicate data set of one of the classifications of the matrix of FIG. 4A, in accordance with one embodiment of the present invention;

FIG. 8J illustrates a horizontally continuous simple horizontally replicate data set of one of the classifications of the matrix of FIG. 4A, in accordance with one embodiment of the present invention;

FIG. 8K illustrates a horizontally continuous regular vertically replicate data set of one of the classifications of the matrix of FIG. 4A, in accordance with one embodiment of the present invention;

FIG. 8L illustrates a horizontally continuous coded-pair vertically replicate data set of one of the classifications of the matrix of FIG. 4A, in accordance with one embodiment of the present invention;

FIG. 8M illustrates a vertically continuous coded-pair non-replicate data set of one of the classifications of the matrix of FIG. 4A, in accordance with one embodiment of the present invention;

FIG. 8N illustrates a vertically continuous simple non-replicate data set of one of the classifications of the matrix of FIG. 4A, in accordance with one embodiment of the present invention;

FIG. 8O illustrates a vertically continuous coded-pair horizontally replicate data set of one of the classifications of the matrix of FIG. 4A, in accordance with one embodiment of the present invention;

FIG. 8P illustrates a vertically continuous simple horizontally replicate data set of one of the classifications of the matrix of FIG. 4A, in accordance with one embodiment of the present invention;

FIG. 8Q illustrates a vertically continuous coded-pair vertically replicate data set of one of the classifications of the matrix of FIG. 4A, in accordance with one embodiment of the present invention;

FIG. 8R illustrates a vertically continuous simple vertically replicate data set of one of the classifications of the matrix of FIG. 4A, in accordance with one embodiment of the present invention;

FIG. 10 is a screen shot illustrating an example of a display wherein a user has selected a set of parameters and data, in accordance with one embodiment of the present invention;

FIG. 11 is a screen shot illustrating a hierarchy of the present invention;

FIG. 12 is a screen shot illustrating an example of a display for filtering discrete data that the user has selected, in accordance with one embodiment of the present invention;

FIG. 13 is a screen shot illustrating an example of a display for filtering continuous data that the user has selected, in accordance with one embodiment of the present invention;

FIGS. 20A, 20B, 20C, 20D, 20E and 20F illustrate a hierarchy of the present invention in spreadsheet form.

DETAILED DESCRIPTION OF THE PREFERRED EMBODIMENT

Definitions

Figure 1:
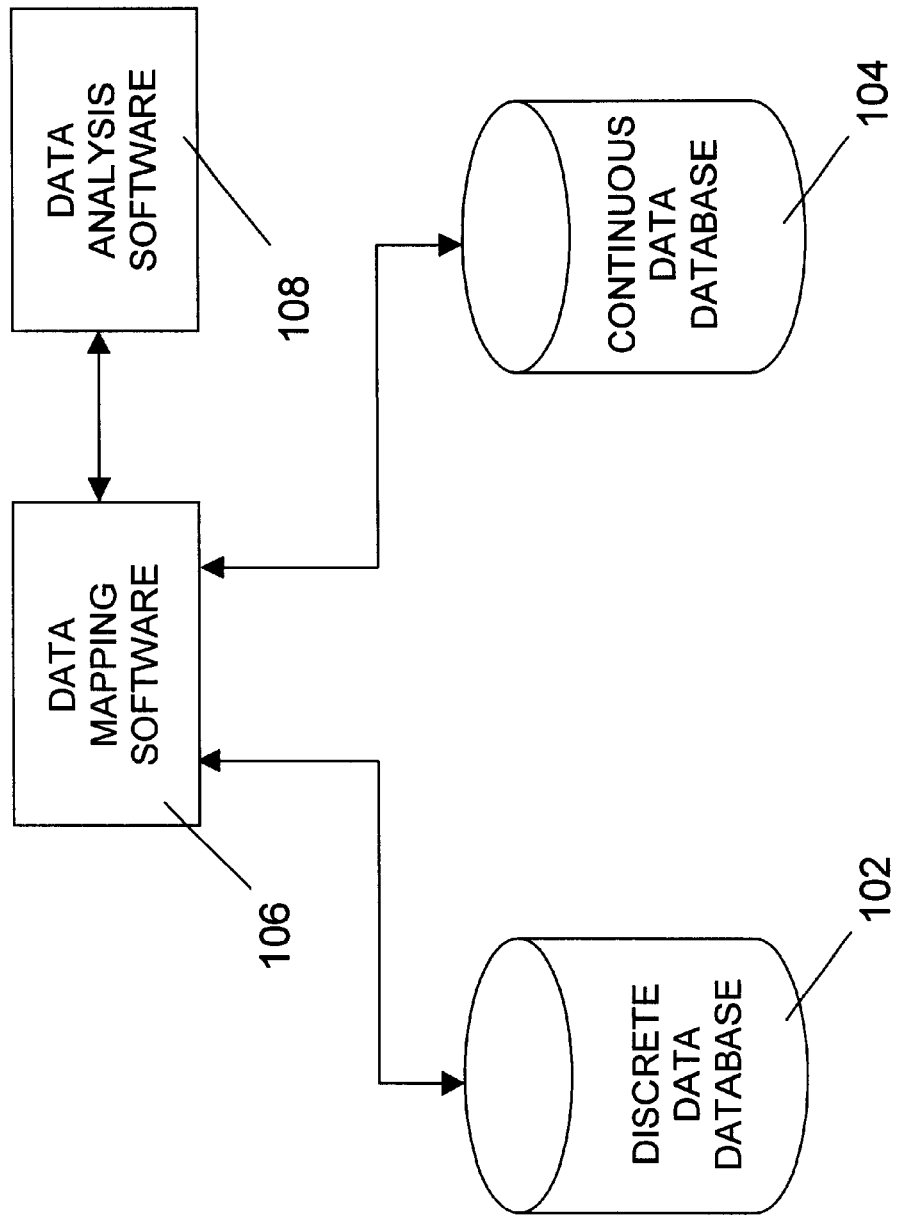
FIG. 1 illustrates a block diagram of data mapping software interacting with a variety of databases and data analysis software, in accordance with one embodiment of the present invention.

It is advantageous to define several terms before describing the invention. It should be appreciated that the following definitions are used throughout this application.

Where the definition of terms departs from the commonly used meaning of the term, applicant intends to utilize the definitions provided below, unless specifically indicated.

For the purposes of the present invention, the term "user" refers not only to end-users of software employing the method of the present invention, but also to individuals, such as software developers or database designers, who carry out one or more steps of the method of the present invention.

For the purposes of the present invention, the term "hierarchy" refers to the treelike structure into which data available to a user is organized in accordance with the method of the present invention. The hierarchy into which data is organized is generally displayed on a visual display device, such as a computer monitor, and parts of the hierarchy may be expanded or contracted using conventional mouse techniques. The structure of a hierarchy may be based on many different types of things. For example, the structure of a hierarchy organizing data about a manufacturing process may be based on: the organization of the steps of the process, on the raw materials used in the process, the equipment used in the process, the facilities or plant locations used in the process, the utilities used in said process, the crews of operators used in said process, etc.

For the purposes of the present invention, the term "data leaf" refers to a parameter location within a database or data set that is represented in a hierarchy. A data leaf describes or represents data but is not data per se. For example, a data leaf called "Glucose pH" could represent the data "7.6", the pH of glucose in a process that the present invention is used to analyze.

For the purposes of the present invention, the term "data node" refers to a node on a hierarchy that represents a restriction on the data leaves beneath the data node on the hierarchy. Inferior data nodes located directly beneath superior data node in a hierarchy represent the cumulative restrictions of both the superior data node and the inferior data node.

For the purposes of the present invention, the term "superior node" refers to a node that is located above another node in a hierarchy. The term "superior node" is a relative term and a given node may be inferior to one or more nodes and superior to one or more nodes at the same time.

For the purposes of the present invention, the term "inferior node" refers to a node that is located below another node in a hierarchy. The term "inferior node" is a relative term and a given node may be inferior to one or more nodes and superior to one or more nodes at the same time.

For the purposes of the present invention, the term "label node" refers to a node in a hierarchy that is used to organize the storing and display of data for a user, but which does not represent a restriction on data, a data leaf or a data node. Therefore, the label nodes located above one or more data nodes in a hierarchy may be rearranged, changed, deleted, add to, etc. without affecting the restrictions associated with the data nodes.

For the purposes of the present invention, the term "process" refers to any process. The method of the present invention may be to access and analyze processes for producing one or more products including manufacturing processes, purification processes, chemical synthesis processes, etc. or may be used for other types of processes such as tracking the shipment of goods, tracking inventory in a store, etc. A process of the present invention includes one or more steps.

For the purposes of the present invention, the term "raw material" refers to starting materials used in a process for producing a product.

For the purposes of the present invention, the term "intermediate material" refers to a material produced during the process prior to producing the product of the process. An intermediate material may be produced by manufacturing the intermediate material from raw materials or other intermediate materials, by purifying raw materials or other intermediate materials, by the synthesis from raw materials or other intermediate materials, etc.

For the purposes of the present invention, the term "batch" refers to a given amount of product and the materials and conditions used to make that given amount of product. Several types of discrete data, continuous data, and replicate data may all be related to a particular batch of product.

For the purposes of the present invention, the term "load" refers to one of one or more amounts of raw or intermediate material used in producing one batch of a product.

For the purposes of the present invention, the term "primary data set type" refers to whether a data set is discrete data, horizontally continuous data, or vertically continuous data.

For the purposes of the present invention, the term "secondary data set type" refers to whether a data set is coded-pair data or simple data.

For the purposes of the present invention, the term "tertiary data type" refers to whether a data set is non-replicate, horizontally replicate or vertically replicate.

For purposes of the present invention, the term "data source" refers to any source of data such as database or data storage file, data directly produced by a measurement device, data electronically sent from a remote location, data entered into a database form paper records, etc. Two data sources are considered to be "different" if the data sources employ different file formats or different data structures or have different physical locations.

For the purposes of the present invention, the term "data set" refers to a set of data or a database. A data set may be classified into a particular "complete data set type" based on the data set's primary data set type, secondary data set type and the same tertiary data set type.

For the purposes of the present invention, the term "data parameter" refers to the heading of a column of data in a data set. Examples of general parameters are batch number, temperature, temperature at given times, test name, humidity, etc.

For the purposes of the present invention, the term "parameter value" refers to the specific piece of data associated with a parameter. Examples of specific parameters include the particular batch number for a parameter, the temperature associated with a parameter at a particular time, the test outcome for a parameter, etc.

For the purposes of the present invention, the term "discrete data" refers to data that is obtained only once during the process of producing one batch of product. Examples of discrete data include: the amount of an ingredient added at some step in a process, the source of an ingredient added at a particular step in a process, the date of production of an ingredient used in a process, etc.

For the purposes of the present invention, the term "continuous data" refers to data parameter values that are obtained at several times during the process of producing a batch of product, with each collection having an associated time. Examples of continuous data include: the temperature at a particular step of a process measured in 5 second intervals for the duration of the step, the moisture content of the effluent air at a particular step measured in 10 second intervals for the duration of the step, the amount of contamination present at a particular step measured in 15 minute intervals, etc.

For the purposes of the present invention, the term "replicate data" refers to data parameter values that are obtained from several measurements of the same parameter made independently of the time of the measurement, i.e. replicate data includes data obtained from multiple measurements of the same parameter taken at the same time and data obtained from multiple measurements of the same parameter taken with no regard as to the time that the measurements were taken. Replicate data may also be discrete data or continuous data.

For the purposes of the present invention, the term "replicate discrete data" refers to discrete data obtained by measuring parameters of a single load of material used in a particular batch of a process. An example of replicate discrete data would be the results of powder fineness measurements of a raw material that came from three different suppliers and was added to a single manufactured batch. In this example, there are three measurements made of the "same" raw material. Replicate discrete data are distinguished as vertical or horizontal based on how they are stored in a database. Vertical replicate discrete values are stored in separate rows, and there is a replicate value column to differentiate the replicate parameters. For vertical replicate discrete data, these columns could correspond to the raw material lot ID number or the measurement instance. Horizontal replicate discrete data refers to replicate discrete data for a parameter that is stored in a single row. This would occur, for example, when three individual particulate surface area measurements are made on portions of the same sample from the same source of final product to minimize the effect of random error.

For the purposes of the present invention, the term "non-replicate data" refers to data values in a data set that are obtained once for a particular parameter, in contrast to replicate data values which are obtained multiple times for a particular parameter.

For the purposes of the present invention, the term "replicate continuous data" refers to continuous data values obtained by measuring parameters of multiple loads of material used in a particular batch of a process. An example of continuous replicate data would occur when a drying machine is too small to dry the total quantity of a single production batch in a single step. In this case the batch would be split into more than one separate drying operation that could be operated sequentially or in parallel and the "same" continuous parameter measurements are made during all three drying operations. In this case, all the continuous parameters associated with the drying step would be measured on each sub-batch and would constitute replicate continuous data for a "single" step. Continuous replicate data are distinguished as vertical or horizontal based on how they are stored in a database. Vertical replicate continuous values are stored in separate rows, and there is a replicate value column to differentiate the replicate parameters. These columns would correspond to the sub-batch ID number. Horizontal continuous replicate data refers to continuous replicate data for a parameter that is stored in a single row.

For the purposes of the present invention, the term "simple value" refers to a data set or database in which the columns in the data set or database contain data values matching the column name, e.g. temperature values stored in a column called TEMP.

For the purposes of the present invention, the term "coded-pair value" refers to a data set or database that contains multiple types of data in a value column, and a data type identifier column. An example of a coded-pair value database is a database having a column named TYPE and a column named VALUE, with the contents of TYPE indicating how to interpret the data instances stored in VALUE. Entries in the TYPE column could include TEMP, PH, VISCOSITY. The entries in the VALUE column would be the actual instances of the data values for TEMP, PH or VISCOSITY. A coded-pair may include two columns of data or three or more columns of data.

For the purposes of the present invention, "taxonomically related data" refers to data that have the same classification, e.g. discrete/coded-pair/non-replicate or discrete/simple/vertically replicate.

For the purposes of the present invention, the term "parameter" refers to any property or characteristic used to classify an individual or multiple pieces of data. For the purposes of the present invention, there are two types of "parameters": "identification codes" and "parameter values." Any parameter that is not used as an identification code for an analysis group is a parameter value. Parameters may include characteristics such as the temperature at a particular time, the pH of a solution, the purity of a compound, the source of a raw material, etc.

For the purposes of the present invention, the term "parameter group" refers to a group of parameters selected by a user in the method of the present invention. A user sets parameter restrictions for one or more of the parameters in a parameter group to create an analysis group.

For the purposes of the present invention, the term "parameter set" refers to a group of parameters that have the same identification code. A parameter set may be obtained from a single data set or multiple data sets. A parameter set may have one or more "parameter values" associated with each parameter in the parameter set.

For the purpose of the present invention, the term "identification code" refers to a parameter that is associated with all of the data in a particular parameter set and that may be used as the primary identification for that parameter set. Typically, an identification code identifies one or more rows of data in a data set or database that is organized by rows. Examples of identification codes include: the manufacturing ID associated with a parameter set, a batch number associate with a parameter set, a lot number associated with a parameter set, etc. Generally, an identification code is a characteristic that is not a measured property, but is rather a characteristic that is assigned to data and is only used for identification purposes. For use in the method of the present invention, the identification code for a parameter set may be tagged to the data in the data set from which the data for the parameter set is obtained or may be manually assigned for a parameter set. An example of manually assigning the identification code for a parameter set is when there are paper documents providing information such as batch number, lot number or manufacturing ID for an identification code for a parameter set, and data from a data set must have this "manually assigned identification code" applied to the data in the parameter set, prior to employing the method of the present invention on the parameter set.

For the purposes of the present invention, the term "analysis group" is a collection of parameter sets that may be selected by a user wherein all of the parameter sets meet the "parameter restrictions" for one or more parameters. For example, an analysis group could include all of the parameter sets which have a median temperature parameter values of 35 to 38° C. for three different time points, a minimum pH parameter value above 7, have the same raw materials supplier parameter, have a raw materials supplied date parameter value of January, etc. An analysis group is a structured data container that supports fast, efficient utilization of data via standardized interfaces. The structure of an Analysis Group permits it to hold all types of data concurrently, e.g. discrete, continuous, replicate, etc. An Analysis Group can be thought of as a sparsely populated multidimensional data cube, with parameter sets (that relate to individual batches of manufactured product) making up one axis, parameter names making up another axis, and time offsets (for continuous parameters) making up another axis, and replicate information making up another axis. Analysis groups also allow the dynamic creation of additional parameters within the analysis groups, allow for the data within them to be subsetted for subsequent operations and allow themselves to be updated with new data from the data sources on an on-demand basis.

For the purposes of the present invention, the term "visual display device" includes any type of visual display device such as a CRT monitor, LCD screen, etc.

Description

The method of the present invention allows discrete data, continuous data and replicate data located in multiple databases to be simultaneously available to a user for analysis. Using the method of the present invention, data from multiple sources that is taxonomically related may be combined across those sources to provide single access to a combined, or joined, data set. This may be a simple operation for discrete data, but may be a more complex operation for continuous data since the time scales for continuous data are rarely identical. By creating views that "join" all the associated data types, the number of needed queries that are generated to select that data is minimized, and the speed with which queries are executed is maximized. The method of the present invention is able to take into account all the joining requirements described above when locating data in multiple databases and making it easily available for analysis by users.

The method of the present invention may provide specific types of parameter set views on a visual display device that allows a user to have easy access to data about a process. Each type of data may even have a specific type of data view that allows the data to be easily selected from a particular data set view. For example, the nature of a parameter set view for a Discrete/Simple/Non-replicate data set may be different than a parameter set view used to view a Discrete/Coded-Pair/Non-replicate data set.

Each type of view may allow application of all the data filters usually used when selecting data stored in databases, e.g. and, or, not, value, type, status, etc. These filters may be simple "where clauses" that restrict the selection to approved data only using a status field, or complex "where clauses" that allow only retrieval of data that fulfill a number of criteria in combination. Since the views hold and apply global restrictions automatically, the SQL code generated when users use the method of the invention need not take these global restrictions explicitly into account. The changes to global restrictions can be implemented flexibly.

In the method of the present invention, multiple views of the same type may exist within a single implementation. An example of this would be a situation involving multiple coded-pair data sources, with each data-source having different columns or rules determining what codes are needed for correct access. Each of the data sources in this example would have a unique view, however all the views would be of the same type.

In the method of the present invention, a user-defined data hierarchy provides the crucial links between how the user wants to see the relationships between parameters and the ultimate data sources from which their data values must be retrieved. Using the method of the present invention, users have significant flexibility to create meaningful hierarchical views of their data. In fact, users may create multiple hierarchies, affording them different ways of seeing the relationship between parameters in their data. Once the user-defined portion of the hierarchy is specified, additional information is added to each of the nodes or leaves in the hierarchy to provide for data mapping. This additional mapping information includes references to the specific tables and columns in which the data is found, which view to use to find the data, and the type of the data, e.g. continuous, discrete, horizontal continuous, discrete replicate, etc.

For manufacturing users, the user-defined portion of a hierarchy used in the method of the present invention may follow following general structure: Product Family Name→Product Name→Manufacturing Step Name→Machine Name→Parameter Name. Other structures are also possible and may be used for logically organizing data relating to domains other than manufacturing, thereby allowing users to model an environment based on relationships between the parameters and their corresponding manufacturing steps, rather than in a data-source-specific manner. All the raw material information and the lab testing information may reside in one type of database such as a Laboratory Information Management Systems (LIMS) database and all the recipe information resides in another type of database, a Electronic Batch Record System (EBRS) database. These are often irrelevant to the order of events in the way a product is manufactured and need not be known to users once the method of the present invention is implemented. The flexibility of the hierarchies allows significantly different interpretations or representations. For example, a hierarchy may be created that is modeled with raw materials as the root rather than finished goods as the root as described in the example above. As long as the general syntactic rules of the hierarchy are followed, there are no limits on the semantic content of the hierarchy.

A significant advantage of the method of the present invention occurs in the creation of "analysis groups." To create an analysis group, a user selects the names of specific parameters that they want included in the analysis group, e.g. pH readings, potency, moisture content, etc. and specifies restrictions on that data, e.g. only batches manufactured in the third quarter whose final potency was greater than 50. The analysis group structure and concept provides a unique way to preserve the associations between all the requested data together in a manner that reflects the organization implied by the hierarchy. The method of the present invention may then be used to analyze the selected parameters and restrictions, generate a minimal spanning set of SQL to select those parameters from the various views and create the Analysis Group for use in analysis and visualization of subsequent analysis results.

The present invention provides a powerful data mapping solution to associate or map various data sets from a variety of data sources, such as databases, so that a user can analyze the data sets. In accordance with one embodiment of the present invention, a user specifies a relationship between different data sets, and the manner in which the user desires to view those particular relationships. From that point forward, the user may easily work with the specified data sets in the specified relationship using conventional data analysis methods. This data mapping functionality is provided by a unique set of operations, as will be described in greater detail below.

FIG. 1 illustrates a preferred embodiment of the process analysis method of the present invention. In the embodiment shown in FIG. 1, the method of the present invention employs a discrete data database 102, a continuous data database 104 which are data mapped using data mapping software 106. Data that has been data mapped using data mapping software 106 is analyzed using data analysis software 108. Discrete data databases 102 and continuous data database 104 may include replicated and/or non-replicate data.

When a plurality of databases are used as shown in FIG. 1, the databases may include a database containing discrete data, a database containing continuous data, a database containing replicate data, more than one database containing any or all of these types of data, and the like. These various databases may contain data representing the results of measurements from or measurements of the parameters of, for example, a manufacturing process or a product being created by a manufacturing process. Accordingly, these databases may contain various different types of data, for example, "recipe" data regarding the quantities of particular materials used to form a product, process or parameter information (e.g., temperature information), or test data (e.g., whether a sample of a product passed or failed a particular test and the degree to which it met the specification). Although FIG. 1 shows the method of the present invention employing a plurality of various databases and data analysis software, the method of the present invention could operate with a single database.

The data analysis software used in the method of the present invention may be, in one example, conventional data analysis software providing statistical analysis, visualization or pattern recognition. Such analysis is used, for example, for statistical quality management, manufacturing productivity enhancements and/or regulatory compliance. In a preferred embodiment, the data analysis software used in the method of the present invention is that found in the DISCOVERANT® software product made by Aegis Analytical Corporation, the assignee of the present invention.

Figure 2:
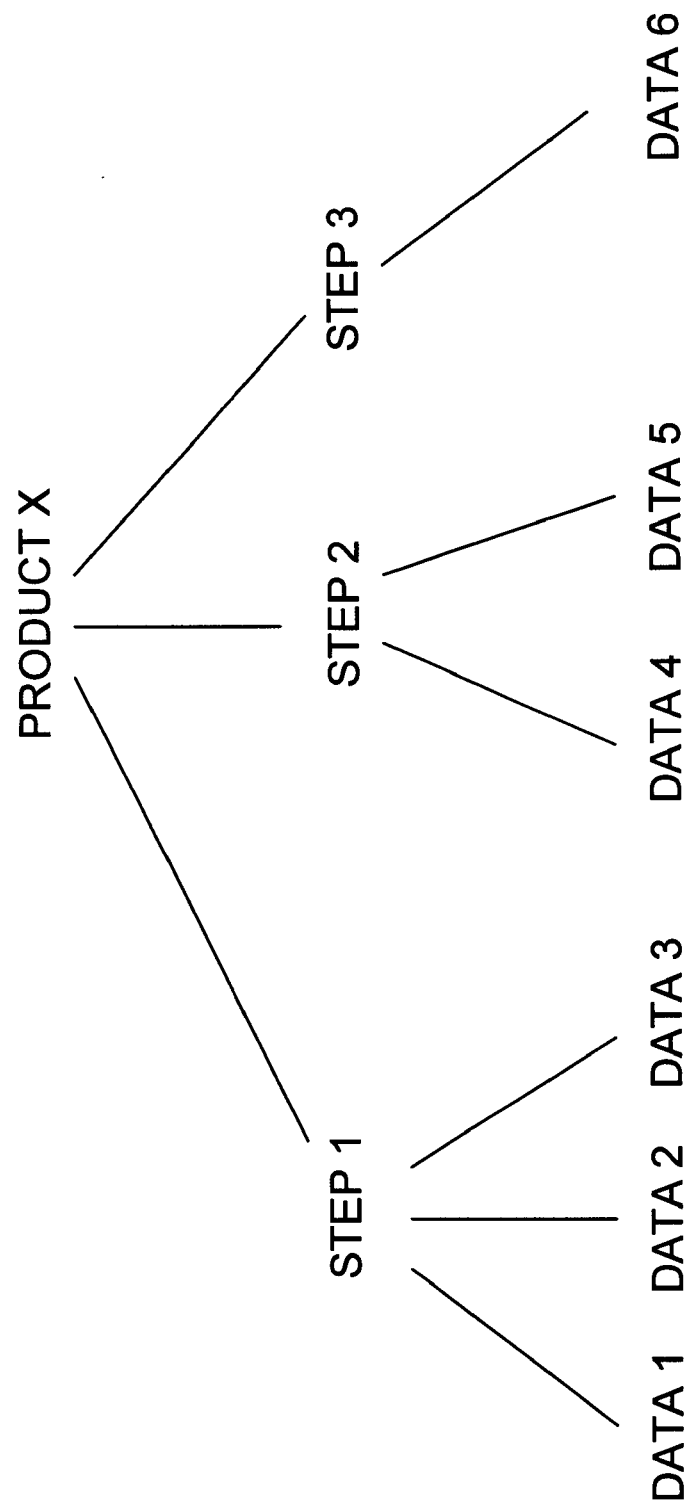
FIG. 2 illustrates an exemplary hierarchy of data elements associated with a process for manufacturing of a product.
Figure 3:
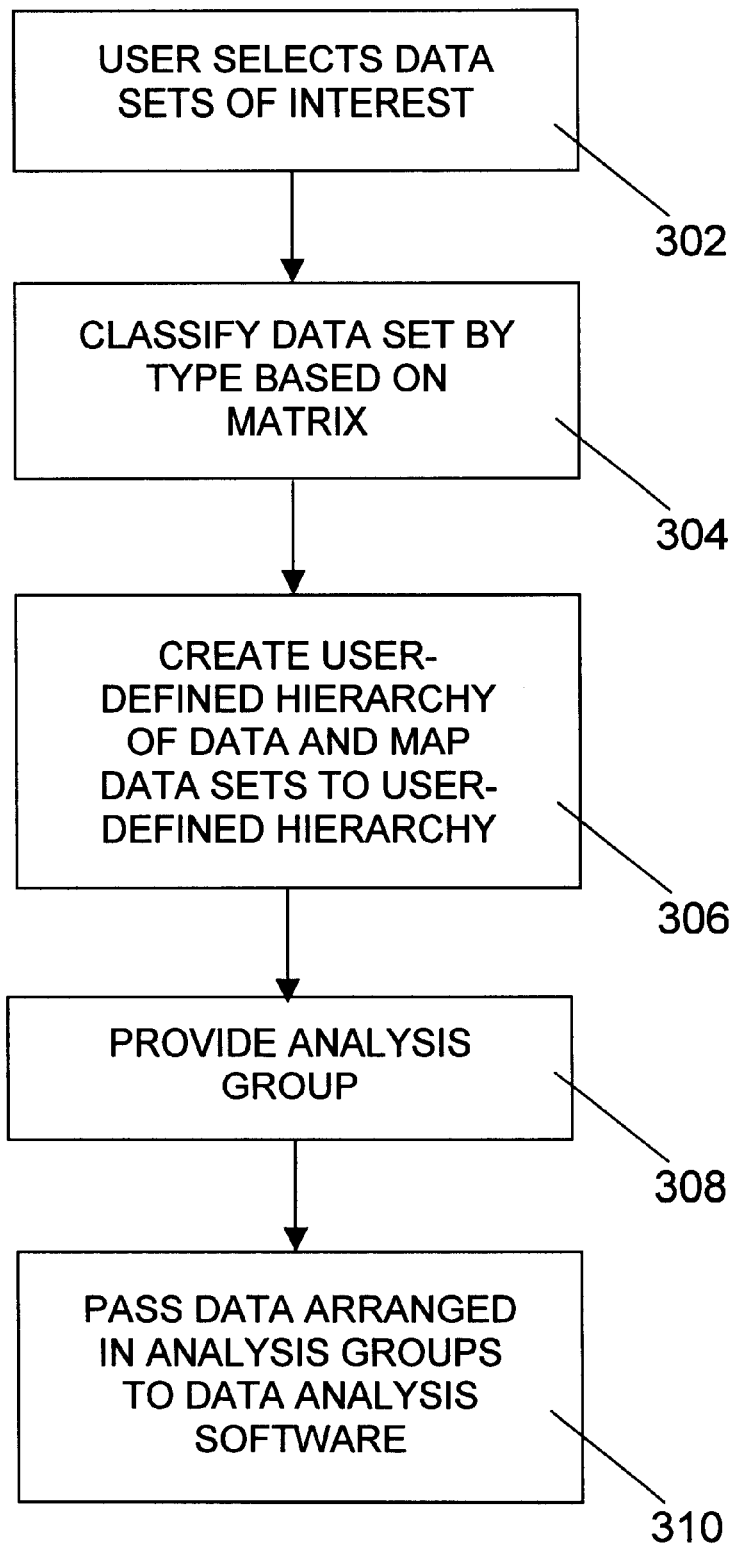
FIG. 3 illustrates the logical operations performed by one embodiment of the present invention.

FIG. 2 illustrates an example hierarchy of data sets shown as DATA1–DATA6, associated with STEPs1–3 of a process to manufacture a product "X". The hierarchy shown in FIG. 3 is a tree structure wherein data sets DATA1–3 are associated with STEP1, data sets DATA4–5 are associated with STEP2, and data set DATA6 is associated with STEP3. These data sets are collected during their respective steps of a manufacturing process and recorded variously in, for example, the databases shown in FIG. 1, using conventional hardware and software systems for gathering and storing such data.

Figures 4A, 4B:
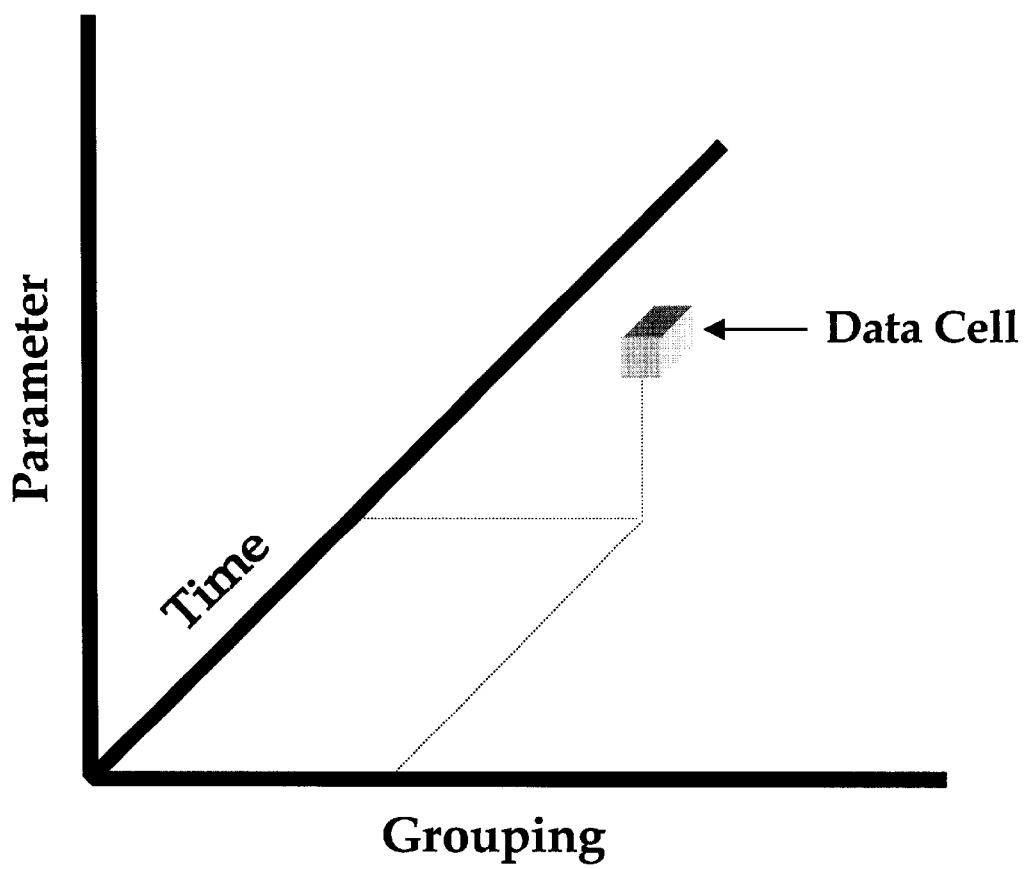
FIG. 4A illustrates a data model matrix in accordance with one embodiment of the present invention.
FIG. 4B illustrates in simplified form an analysis group of the present invention on a three-dimensional graph.

FIG. 3 illustrates the operations of a preferred embodiment of the present invention. In box 302 a user selects data sets of interest. In a first operation 304, a data set is classified by data type based on a data model. The data model used may be a matrix having various classifications of data types within the matrix, as shown in FIG. 4A. In a second operation 306, a user-selected and user-defined hierarchical view of the data sets is created by the user. The hierarchy may be visually expressed by sharing the data sets classified by data types, and in a preferred embodiment, the data mapping software of the present invention allows a user to easily access the data values of the data sets using simple mouse clicks. The software maps the data sets selected by the user, within the hierarchy defined by the user, as will be explained below. In a third operation 308, the data mapping software provides an analysis group of the data from the selected data sets, which is a structured collection of the data suitable for further data analysis by the user or by data analysis software. In a preferred embodiment of the present invention, an analysis group is a three-dimensional data structure of the type shown in FIG. 4B, which is characterized by user-selected data values of user-selected parameters. Analysis group creation will be described below. In a fourth operation 310, data in the analysis group is passed to data analysis software for further data analysis. As mentioned above, such data analyses may include such conventional types of analysis as data mining, statistical analysis, pattern recognition, graphical visualization, etc.

FIG. 4B illustrates how an analysis group may be thought of as a sparsely populated data cube. One axis of the cube is the parameter axis. The parameter axis represents the individual data points that have been selected by the user for including in the analysis group (e.g. pH, density, contamination, etc.). A second axis is the "grouping" axis for the identification codes that data is being selected for. A third axis of the cube, the time axis, is necessary for an analysis groups including continuous data.

In a manner similar to the manner described above, the present invention provides a system and method for user access by mapping and analyzing data from a disparate set of sources, as is the case with manufacturing processes for example, without having to utilize a time consuming conventional manual process for accessing the data.

In accordance with a preferred embodiment of the present invention, data classifications are provided to characterize data sets, preferably in the manufacturing context. In one example, a data model matrix is a 3×2×3 matrix defining 18 classifications or data types, as shown in FIG. 4A. The data model matrix shown in FIG. 4A is based on the three general classes of data defined above as discrete data, continuous data and replicate data. These three general classes of data are believed to be generally representative of the data present in, for example, a manufacturing environment.

As shown in FIG. 4A, along a first axis, data sets are classified by data type depending on whether the data set is a discrete data set, a horizontally continuous data set or a vertically continuous data set. A discrete data set has only a single instance within a batch (e.g., the amount of an ingredient added at some operation in a process).

Both horizontally and vertically continuous data sets have multiple time stamp incidences per batch (e.g., temperature measured at five second intervals throughout the duration of some operation in a process). A horizontally continuous data set is a data set wherein each component of the data set is stored within the same row of a database, and typically represents parameters having explicit time stamps associated with each data value (e.g., a measurement of a value sampled at particular time intervals). A vertically continuous data set is a data set wherein each piece of data is stored in an independent row of a database and wherein each piece of data has both a value and a time stamp associated therewith (e.g., different values of a single continuously measured process parameter from the same manufactured batch are stored in different rows and are distinguished by their time stamp or date).

The distinctions between horizontally continuous data sets and vertically continuous data sets are important because the SQL queries to access the data of either data type are different.

Referring again to FIG. 4A, along a second axis, a data set is classified according to whether it is stored in the databases as a simple value or as coded value pairs. In coded value pairs, the values of the data sets are stored in two columns of a database, wherein a "value" column contains multiples of data, and a "key" or "identifier" column contains entries which identify the type of data stored in the respective row of the value column. In other words, the contents of the type column indicate how to interpret the data instances stored in the value column. Entries in the "identifier" column could, for example, include TEMP, PH and VISCOSITY, while the entries in the value column would be actual instances of the data values for TEMP, PH and VISCOSITY. In contrast, simple values are, for example, a table of raw data that is all of the same type of data (e.g., a table containing temperature data).

Along the third axis, data sets are classified as a normal "non-replicate value" data set, a vertical replicate data set or a horizontal replicate data set. As to horizontal replicate data sets and vertical replicate data sets, these replicate data sets generally occur when parameter values are repeated, but in a manner different from continuous time stamp data sets described above with reference to the first axis. The replicate data sets shown along the third axis do not have associated time stamps, but rather they are simply replicate measurements of the same parameter made independently of any time measurement.

For example, replicate data sets may contain the values that result from measurements of the fineness of a powder of raw materials that came from different suppliers and which were added to a single manufactured batch of final product. In this example, assume that there are three measurements made of the same raw material. The vertical replicate data sets are values stored in separate rows of a database, and there is a replicate value column to differentiate the replicate parameters (e.g., these columns would correspond to the raw material lot ID number or the measurement instance). The horizontal replicate data sets contain replicate values for a parameter stored in a single row of a database. This would occur, for example, when three individual particulate surface area measurements are made on portions of the same sample from the same source of a final product to minimize the effect of random error, and the results would be stored in a table with columns, for example, SA_1, SA_2 and SA_3.

In accordance with the present invention, using these classifications of data sets allows all types of data sets, which typically occur in a manufacturing process, to be represented within the data model shown in FIG. 4A. Once the data sets are classified into their respective types, a set of database views can be developed to provide access to the specific classes of data found at a manufacturing location. For efficiency reasons, data sets having the same classification are often grouped together into the same database view. The creation of these database views is performed, in one example, using standard data modeling techniques, well known to persons skilled at data modeling and database administration. The particular contents of the data sets greatly dictate how many views are created to access the data. For example, vertical continuous/coded-pair/normal data sets may require an individual view for each data set due to differing rules on how the code values are used. In another example, two different vertical continuous/simple/ normal data sets may be accessible by the same database view. The exact nature of the database views that must be created is dependent on the specific data sets being mapped.

The data sets that are classified as similar data types in the matrix of FIG. 4A may be combined to provide single access to a combined, or joined data set. This is true even if the data sets are stored in different databases or data sources. Commercially available products, such as Enterworks Content Integrator from Enterworks, Inc. or Oracle Gateways from Oracle Corporation, may assist with locating data in multiple data sources.

Generally, the data sets relating to raw material information and lab testing information typically reside in a LIMS database, data sets relating to recipe information resides in an EBRS database, and the data sets relating to measurements made from instruments mounted on manufacturing equipment resides in a process historian associated with a SCADA (Supervisory Control and Data Acquisition) or DCS (Distributed Control System) system. However, in accordance with the present invention, these physical locations of the data sets are transparent to the user of the mapping software of the present invention, and are unimportant to the manner in which a product itself is manufactured or how the data is to be analyzed.

The classification matrix is also described with respect to FIGS. 5, 6 and 7 and 8A, 8B, 8C, 8D, 8E, 8F, 8G, 8H, 8I, 8J, 8K, 8L, 8M, 8N, 8O, 8P, 8Q and 8R.

Figure 5:
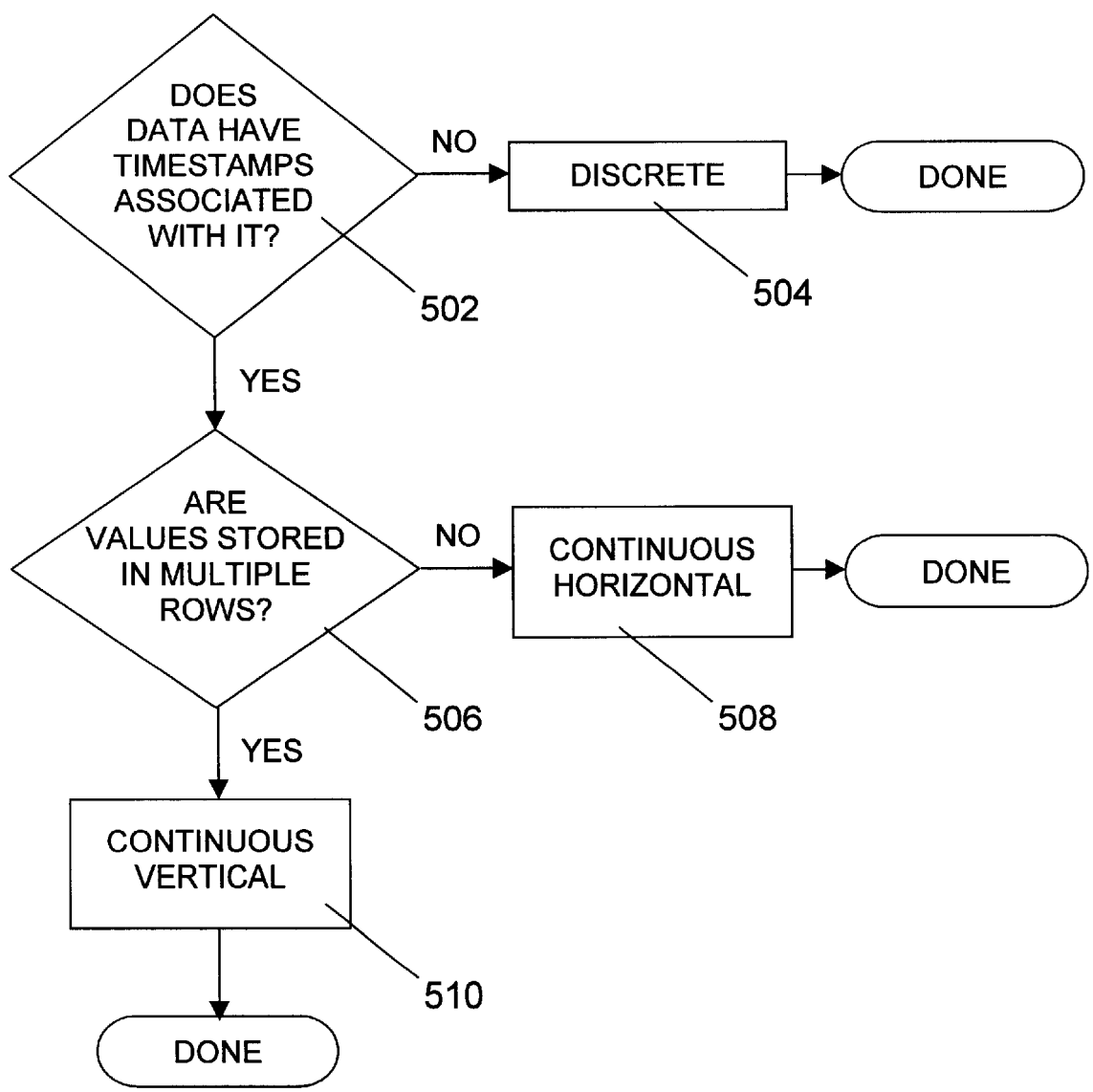
FIGS. 5, 6 and 7 illustrate logical operations for classifying a data set into the matrix of FIG. 4A, in accordance with one embodiment of the present invention.

FIG. 5 illustrates the logical operations for determining if a data set is discrete, horizontal continuous or vertical continuous data. Operation 502 determines whether data has time stamps associated with the data. If there are no timestamps associated with the data, the data is determined to be discrete as shown in box 504. If there are timestamps associated with the data, control is passed from operation 502 to operation 506. Operation 506 determines whether the data has values stored in multiple rows. If the data does not have values stored in multiple rows, the data is determined to be horizontal continuous data as shown in box 508. If the data does have values stored in multiple rows, the data is determined to be vertical continuous data as shown in box 510.

Figure 6:
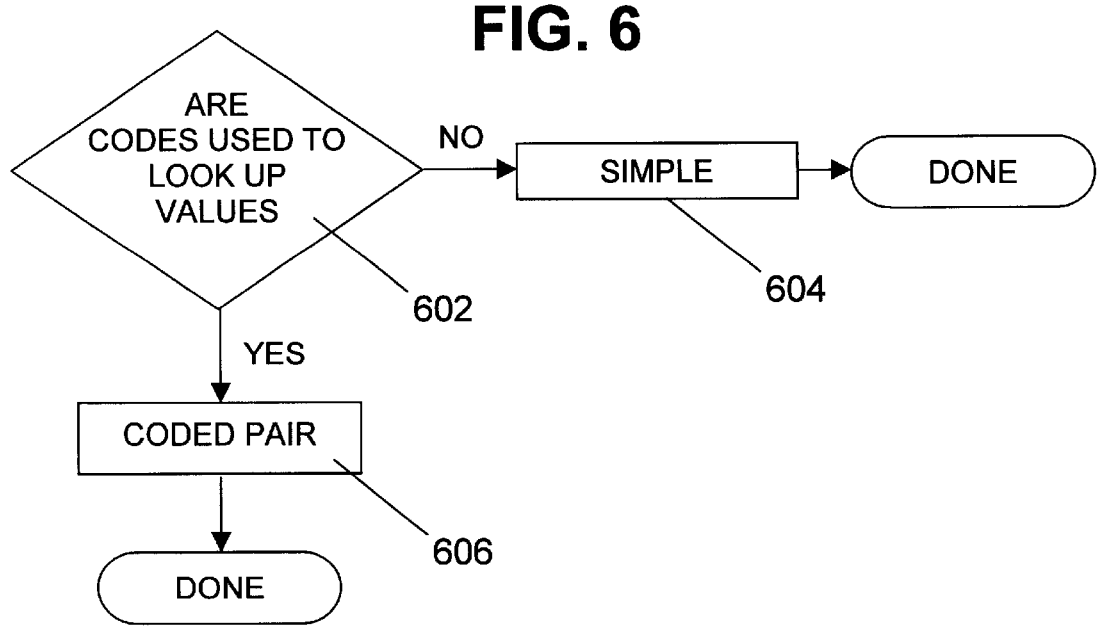

FIG. 6 illustrates the logical operations for determining if a data set is simple or coded-pair data. Operation 602 determines whether codes are used to look up the values of the data. If no codes are used to look up values of the data, the data is determined to be simple as shown in box 604. If codes are used to look up values of the data, the data is determined to be coded-pair data as shown in box 606.

Figure 7:
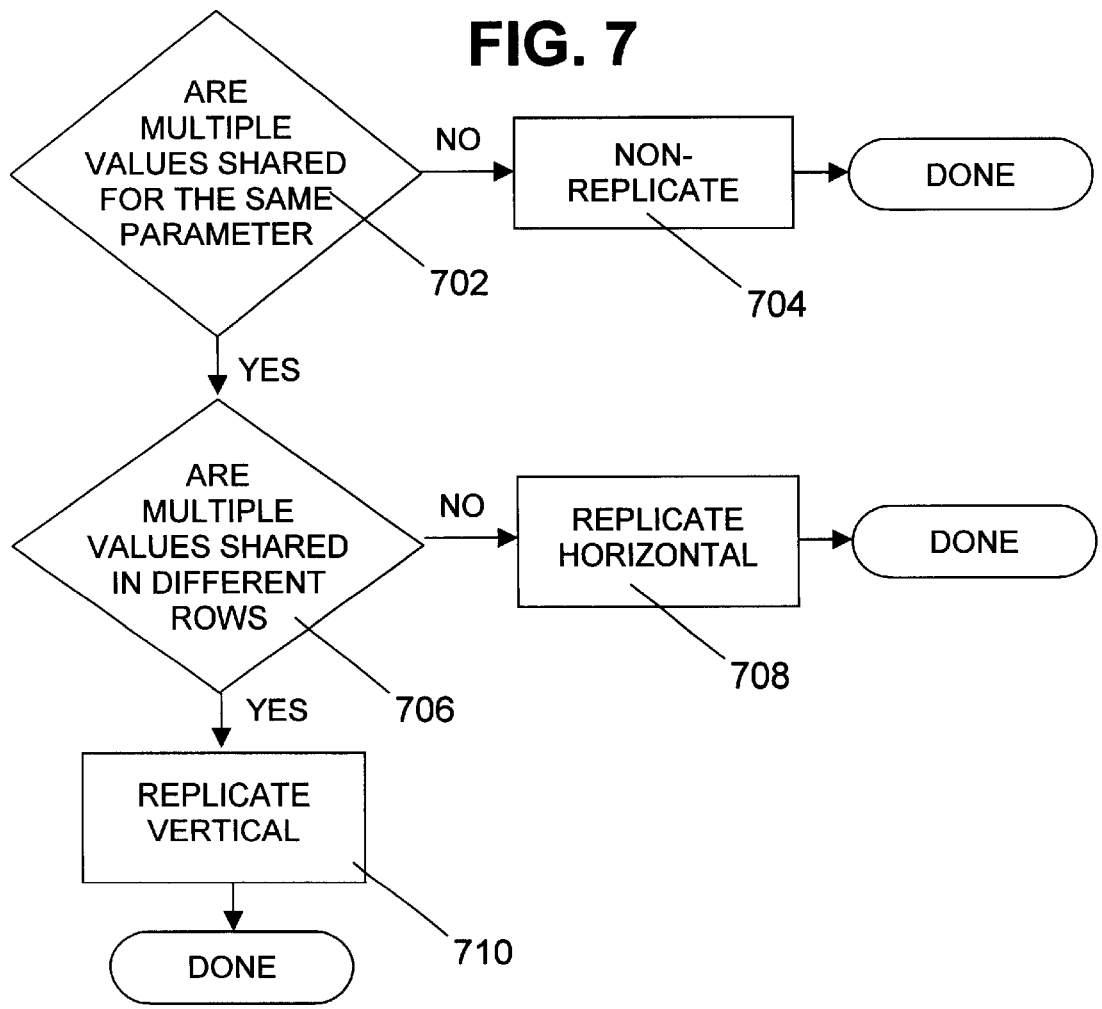

FIG. 7 illustrates the logical operations for determining if a data set is simple, replicate vertical or replicate horizontal data. Operation 702 determines whether multiple values are stored for the same parameter in the data. If multiple values are not stored for the same parameter in the data, the data is determined to be non-replicate as shown in box 704. If multiple values are stored for the same parameter in the data, control is passed from operation 702 to operation 706. Operation 706 determines whether the data has multiple values stored in different rows. If the data does not have multiple values stored in different rows, the data is determined to be horizontal replicate data as shown in box 708. If the data does have multiple values stored in different rows, the data is determined to be vertical replicate data as shown in box 710.

Using the logical operations of FIGS. 5, 6 and 7, a data set may be characterized into one of the 18 positions within the matrix of FIG. 4A. FIGS. 8A, 8B, 8C, 8D, 8E, 8F, 8G, 8H, 8I, 8J, 8K, 8L, 8M, 8N, 8O, 8P, 8Q and 8R illustrate example data sets for each of the 18 positions within the matrix of FIG. 4A.

FIG. 8A illustrates a discrete coded-pair non-replicate data set. FIG. 8B illustrates a discrete coded-pair horizontally replicate data set. FIG. 8C illustrates a discrete code-pair vertically replicate data set. FIG. 8D illustrates a discrete simple non-replicate data set. FIG. 8E illustrates a discrete simple horizontally replicate data set. FIG. 8F illustrates a discrete simple vertically replicate data set. FIG. 8G illustrates a horizontally continuous simple non-replicate data set. FIG. 8H illustrates a horizontally continuous coded-pair non-replicate data set. FIG. 8I illustrates a horizontally continuous coded-pair horizontally replicate data set. FIG. 8J illustrates a horizontally continuous simple horizontally replicate data set. FIG. 8K illustrates a horizontally continuous simple vertically replicate data set. FIG. 8L illustrates a horizontally continuous coded-pair vertically replicate data set. FIG. 8M illustrates a vertically continuous coded-pair non-replicate data set. FIG. 8N illustrates a vertically continuous simple non-replicate data set. FIG. 8O illustrates a vertically continuous coded-pair horizontally replicate data set. FIG. 8P illustrates a vertically continuous simple horizontally replicate data set. FIG. 8Q illustrates a vertically continuous coded-pair vertically replicate data set. FIG. 8R illustrates a vertically continuous simple vertically replicate data set.

In accordance with one embodiment of the present invention, a data hierarchy is provided which permits a user to visually relate the data sets of a manufacturing process to the particular steps of the manufacturing process.

Figure 9:
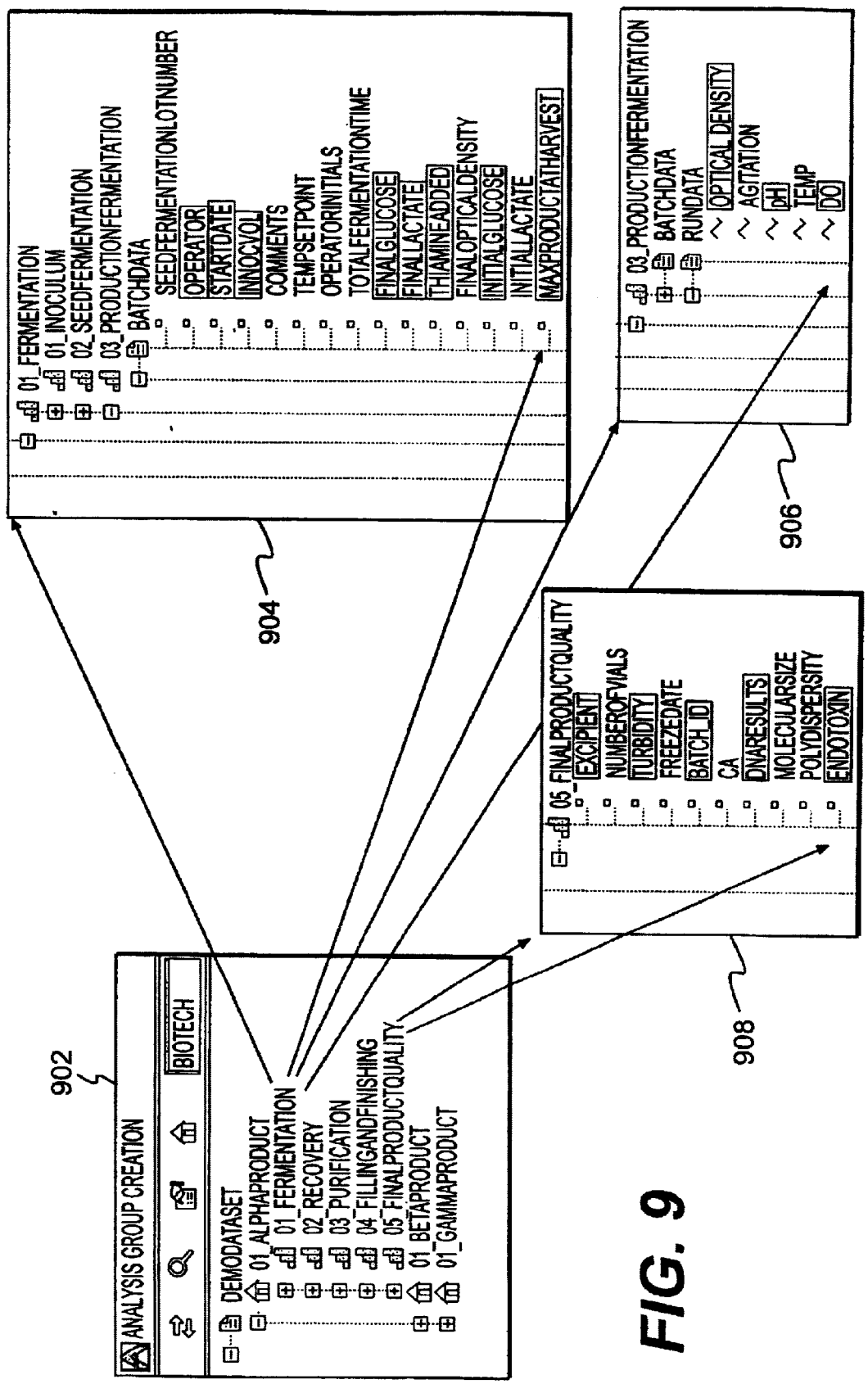
FIG. 9 illustrates several partial screen shots, in accordance with one embodiment of the present invention.
Figure 10:
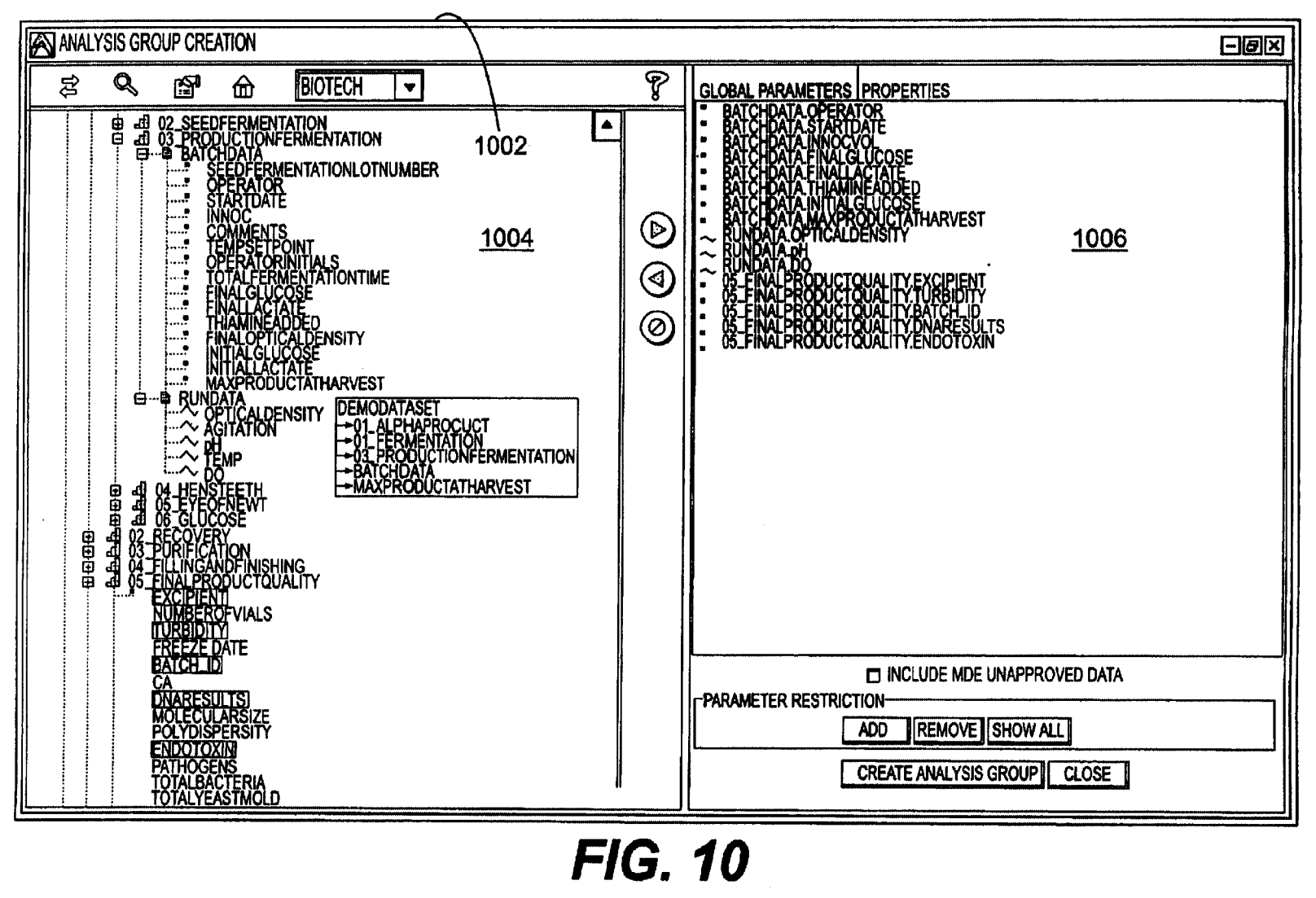

In one example, the software allows analysis groups to be easily created and displayed as shown in FIGS. 9 and 10. FIG. 9 shows four partial screens 902, 904, 906, and 908 illustrating steps used in creating an analysis group of the present invention. FIG. 10 illustrates a full screen 1002 of steps used in creating analysis group of the present invention. Partial screen 902 is a partial screen of full screen 1002.

In FIG. 9, parameter names are first organized by the product produced as shown in partial screen 902. Alpha, Beta and Gamma-product are example names of manufactured products. For each product, parameter names are organized based on their relationship to the steps in the manufacturing process used to produce the product. For example, the process for producing the alpha product includes the following hierarchical steps: 1) Fermentation, 2) Recovery, 3) Purification and 4) Filling and finishing. Final product quality is a virtual step in the process used to organize the parameters relating to final product quality measurements. The process of producing the alpha product may involve other steps, but the above-listed steps are the example steps for which data is available for use in the analysis method of the present invention. As shown in partial screen 904, the Fermentation step includes the hierarchical sub-steps: 1) Inoculum, 2) Seed fermentation and 3) Production fermentation, the parameters in sub-step 3. Production fermentation is organized by batch, as shown in partial screen 904 and run as shown in partial screen 906. Therefore, the batch number may be used as the identification code for parameters shown in partial screen 904 and the run number may be used as the identification code for parameters from partial screen 906.

Partial screen 904 illustrates that data for the following parameters are available for at least some of the batches for the product fermentation sub-step: SeeFermentationLotNumber (see fermentation lot number), Operator (operator name), StartDate (batch start date), InnocVol (inoculation volume), Comments (operator comments), TempSetPoint (temperature set point), OperatorInitials (operator initials), TotalFermentationTime (total fermentation time), FinalGlucose (final amount of glucose added), FinalLactate (final amount of lactate accumulated), ThiamineAdded (amount of thiamine added), FinalOpticalDensity (final optical density), InitialGlucose (initial glucose amount), InitialLactate (initial lactate amount), and MaxProductAtHarvest (maximum amount of product at harvest). Each of the parameters in partial screen 904 has results that are discrete data, as indicated by the black block to the left of each parameter name. The batch data as shown in partial screen 904 is a discrete data set that may have been created from one or more discrete data sets.

Partial screen 906 illustrates that data for the following parameters are available for at least some of the runs of the product fermentation sub-step: OpticalDensity (optical density), Agitation (agitation speed), pH (pH), Temp (temperature) and DO (dissolved oxygen). Each of the parameters listed in the batch data shown in partial screen 906 is a continuous data set that may have been created from one or more continuous data sets.

Partial screen 908 illustrates that data for the following parameters are available for the final product quality step: Excipient (excipient), NumberOfVials (number of vials), Turbidity (turbidity), FreezeDate (freeze date), Batch_ID (batch ID), CA (calcium). DNAResults (DNA results), MolecularSize (molecular size), Polydispersity (polydispersity) and Endotoxin (endotoxin level). The data for the final product quality as shown in partial screen 908 is a discrete data set As shown in FIGS. 9 and 10 to begin creating an analysis group, a user expands DemoDataSet using conventional means to show the hierarchical nodes for three products: alpha product, beta product and gamma product in the demo data set. A user then expands the other nodes to gain access to particular parameters needed for data analysis. For example, a user may expand the AlphaProduct node to show the hierarchical nodes for the steps in producing the alpha product as shown in partial screen 902. A user may then expand the listing Fermentation node to show the sub-steps of the fermentation step as shown in partial screen 904. A user may then expand the ProductFermentation node to show the nodes BranchData and RunData as shown in partial screens 904 and 906. A user may then expand the node BatchData to list the batch parameter values for the product fermentation sub-step. A user may then select the following parameters: Operator, StartDate, InnocVol, FinalGlucose, ThiamineAdded, InitialGlucose and MaxProductAtHarvest, indicated by highlighting in partial screen 904. A user may then expand the RunData node and select the following parameters: optical density, pH and DO, indicated by highlighting in partial window 906. A user may then expand the FinalProductQuality node in partial screen 902 and select the parameters Excipient, Turbidity, Batch_ID, DNAResults and Endotoxin. Each of the nodes may be expanded in any order to provide access to and selection of any parameter name in any order.

Full screen 1002 of FIG. 10 is divided into a left screen 1004 and a right screen 1006. Left screen 1004 shows the hierarchical structure of parameters for several steps of the alpha product. Right screen 1006 shows a parameter group of all of the parameters selected as shown in FIG. 9. By setting parameter restrictions on one or more of these parameters, a user may refine the contents of an analysis group before submitting it for creation.

Figure 11:
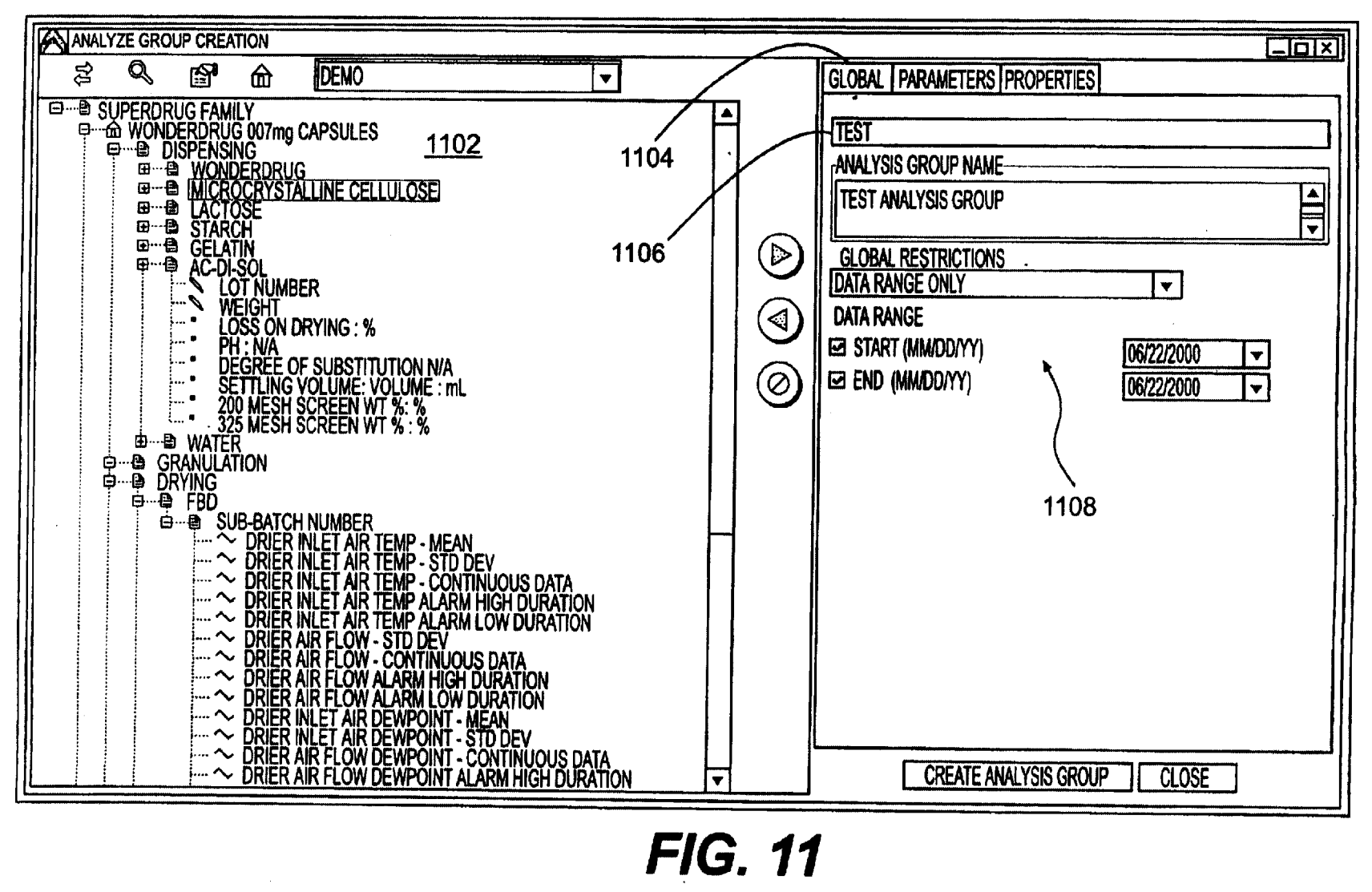

FIG. 11 illustrates a hierarchy 1102 created using the process analysis software DISCOVERANT®. Screen 1102 is used to define an analysis group prior to executing queries from a data set. A global tab 1104 is selected and a name 1106 of the analysis group is entered as well as global restrictions 1108, in this case, a date range.

Figures 12, 13:
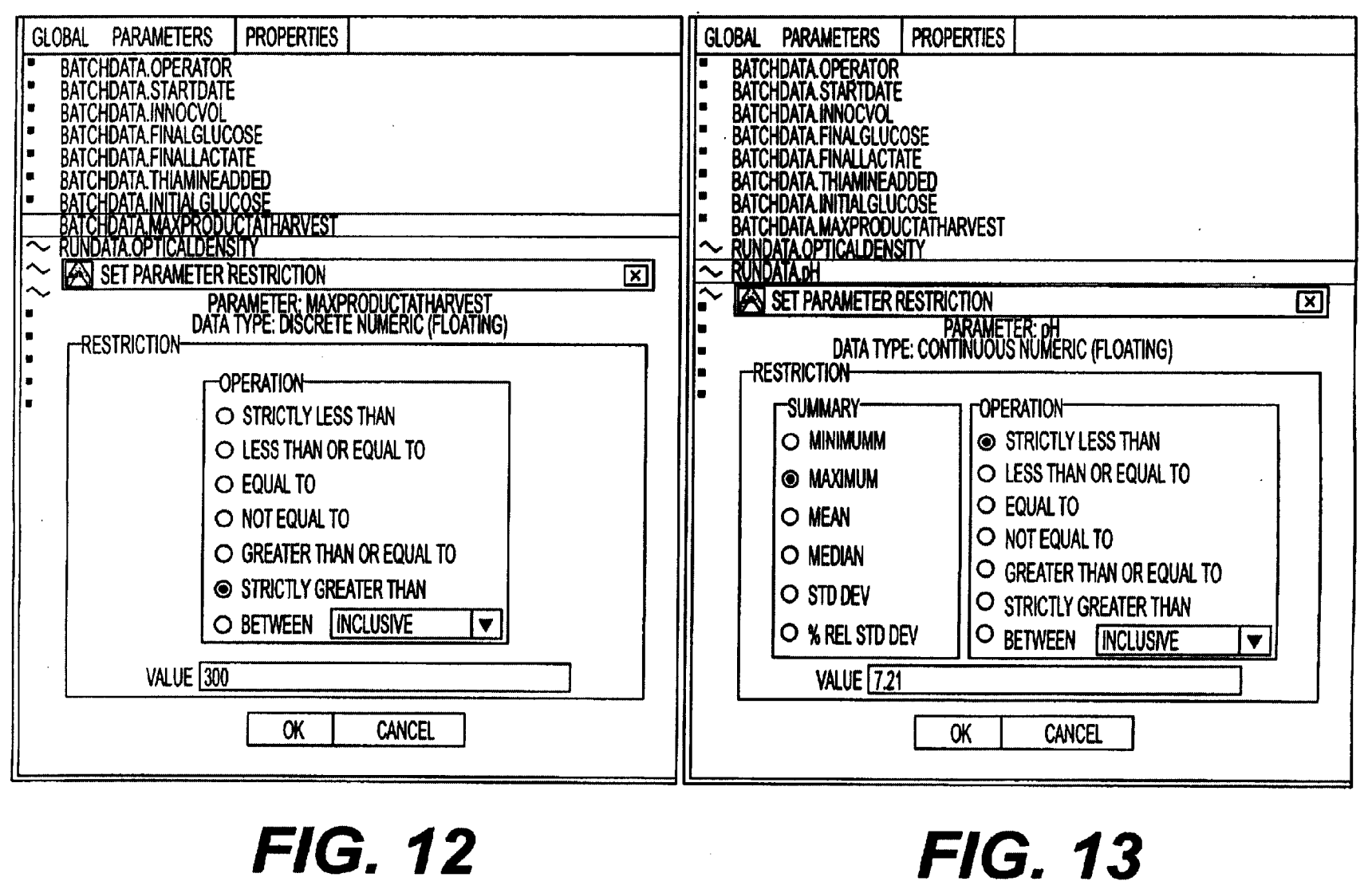

In FIG. 12 a user selects the BatchData.MaxProductAtHarvest parameter from the parameter group of FIG. 10 and sets a parameter restriction on the BatchData.MaxProductAtHarvest parameter that the BatchData.MaxProductAtHarvest parameter for all of the data in the analysis group the user is creating must have a value greater than 300 inclusive. As indicated in FIG. 12, the BatchData.MaxProductAtHarvest is associated with a discrete data set.

In FIG. 13 a user selects the RunData.pH parameter from the parameter group of FIG. 10 and sets a parameter restriction on the RunData.pH parameter that the RunData.pH parameter for all of the data in the analysis group the user is creating must have maximum value less than 7.2 inclusive. As indicated in FIG. 13, the BatchData.MaxProductAtHarvest is associated with a continuous data set.

A user may create and display an analysis group using just the parameter restrictions shown in FIGS. 12 and 13, or may set restrictions on any of the other parameters shown in the parameter group of FIG. 13 to create an analysis group. Once an analysis group is created, a user may display the results of the analysis group in a conventional display, such as a table of data organized by batch number, a series of data points on a chart, a bar graph, etc.

As shown in FIGS. 12 and 13, the present invention may employ parameter restrictions and employ conventional data filters, usable upon the values of the selected data sets retrieved from a database (e.g., combinatorial logical operations such as "and," "or," "not," or filtering by value, type, status, etc.). These filters can be simple "where" clauses that restrict the selection of data from a data set of approved data using a status field; or complex "where" clauses that retrieve only data which fulfills a number of criteria in combination. In one example, the data mapping software of the present invention holds and applies these global restrictions automatically. The hierarchy created is independent of the particular data source from which a data set is retrieved. In a preferred embodiment, a user may create multiple hierarchies permitting a user to see the data set in different ways.

In general, to create an analysis group, a user selects the names of specific parameters which they would like to include (e.g., pH readings, moisture content, potency, etc.) and specifies any parameter restrictions on that data (e.g., batches manufactured in third quarter whose final potency was greater than 50). Then, in a preferred embodiment of the present invention, selected data sets are accessed using the specified restrictions, a minimal spanning set of SQL queries is automatically generated to select those data sets from the various views, and an analysis group is created for use in analysis and visualization of results. Data from user-selected data sets may be manipulated to fit into the analysis group structure. For instance, replicate data values may be converted and flattened into discrete representations, thereby permitting the replicate values to be combined with discrete values in the analysis group. Further, the structure of the analysis groups of the present invention permit time offsets to be associated with continuous data, thereby permitting continuous data to be mapped by their offset times in the analysis group.

Analysis groups also permit the dynamic modification or creation of additional parameters within the analysis groups so that the user need not reformulate the entire analysis group construct in order to change a parameter of the analysis group. A user can edit or delete parameters from an analysis group, and the analysis group data values will be refreshed thereafter.

Although only one hierarchy for organizing parameters and data is shown in FIGS. 9 and 10, other types of hierarchies may be used to organize the parameters and data of the present invention. One example of a hierarchy in the manufacturing context could be a tree structure including, at the root level, a product family, descending to a product, the manufacturing steps, the machines or instruments and the parameter names. Other structures are also possible and may be used for logically organizing the data relating to applications outside of manufacturing processes. The user-defined data hierarchies allow a user to model an environment based on the relationships of the parameters in the flow of the overall manufacturing process, rather than modeling based on specific data sources only. The hierarchy created can be modeled in any manner desirable to the user so long as the general syntactic rules of the hierarchy are followed. For example, a hierarchy could be created that is modeled with the raw materials as the root of a hierarchical tree structure.

The data hierarchy can be incorporated into a computing system either as a spreadsheet with columns having hierarchy data, or through a graphical user interface for creating and editing a hierarchy. The hierarchical structure may be provided to the user prior to employing the analysis method of the present invention or the user may create a customized structure for the process the user wishes to analyze. In one preferred method of creating a hierarchical structure for use in the method of the present invention, a user may create a hierarchical structure using the following steps: 1) Develop an initial hierarchical structure, 2) Map parameters in the hierarchical structure to locations in the source data sets, 3) Create an inventory of data elements accessed within the hierarchical structure, 4) Create a data model or view structure to access all of the required data elements, 5) Implement and test the performance of the data model, 6) Translate hierarchical elements to data model elements, 7) Construct a data inventory, 8) Verify hierarchical structure contents, 9) Edit the hierarchical structure where necessary, and possibly return to steps 2, 4 or 6, 10) Translate the hierarchy into single file format, 11) Load the hierarchical file into the program for performing the method of the present invention, such as DISCOVERANT®, and 12) Test analysis group results versus expectations.

Figure 14:
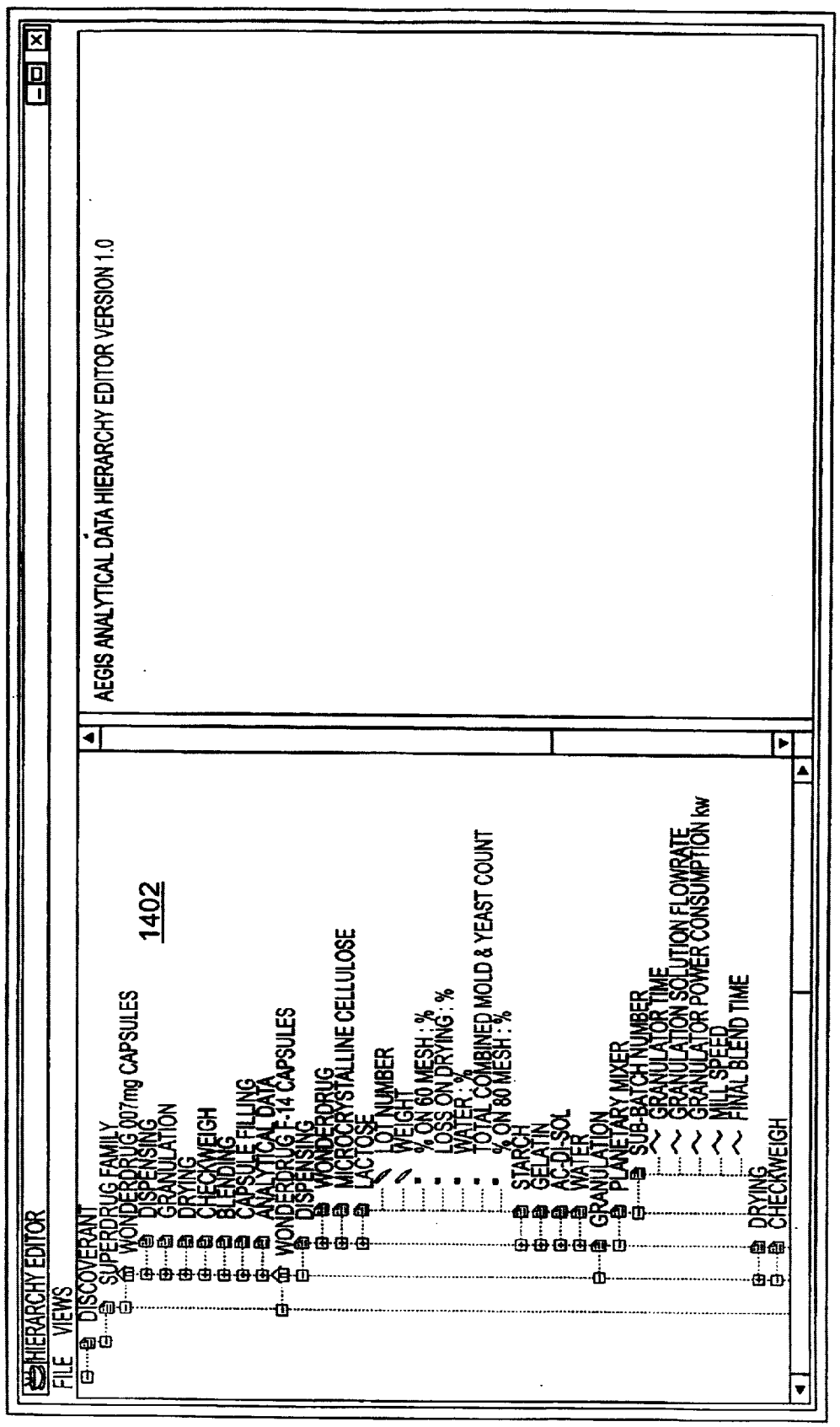
FIG. 14 is a screen shot illustrating an example of a display of a hierarchy editor having a sample hierarchy, in accordance with one embodiment of the present invention.

FIG. 14 illustrates a hierarchy editor 1402 and a sample hierarchy of the present invention.

Figure 15:
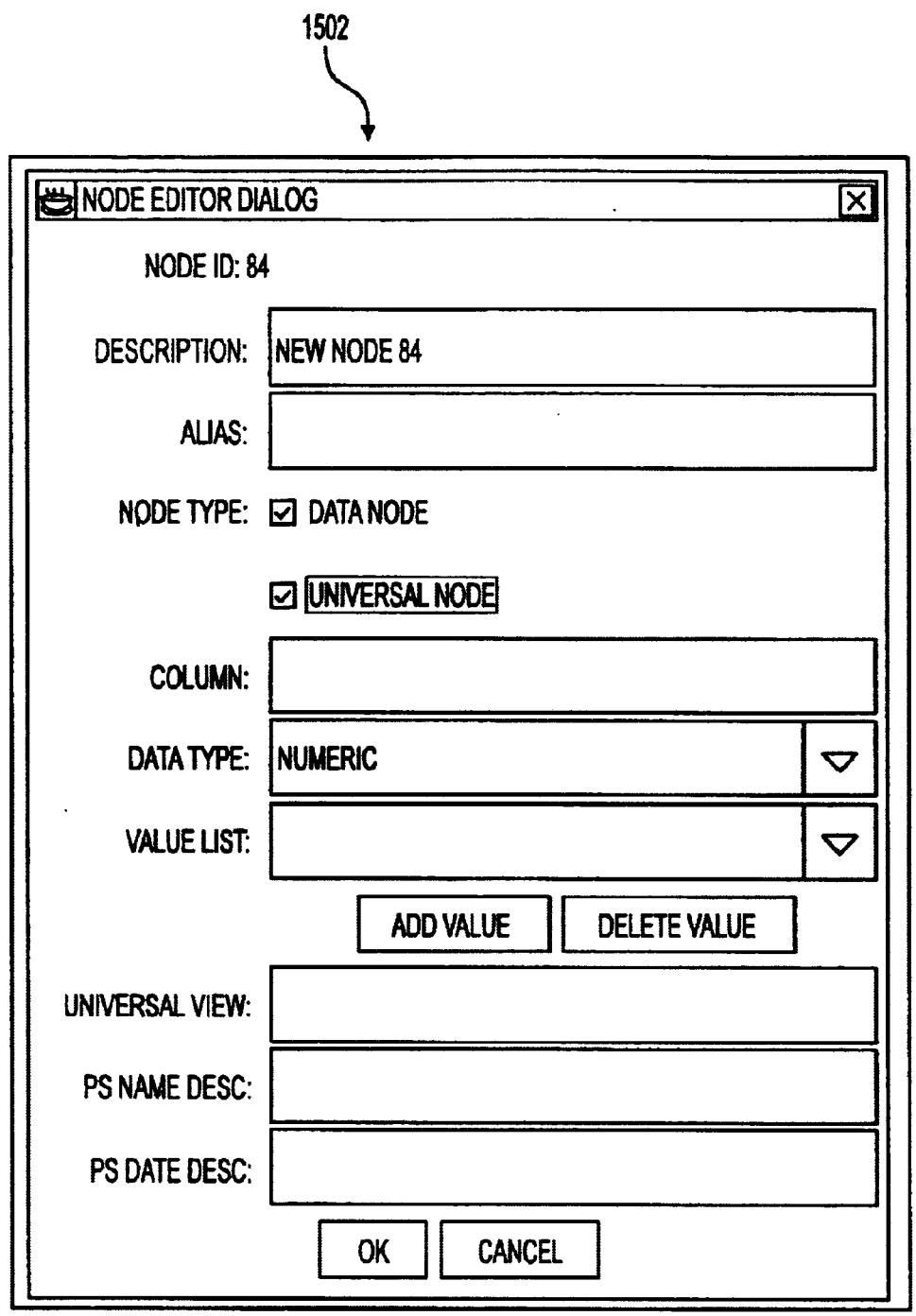
FIG. 15 is a screen shot illustrating an example of a display of a hierarchy editor with a node editor dialog box, in accordance with one embodiment of the present invention.

FIG. 15 illustrates a screen 1502 from hierarchy editor 1402 that shows how a new node may be added to hierarchy 1402. The fields in screen 1502 correspond to the columns in a data set, such as a spreadsheet.

Figure 16:
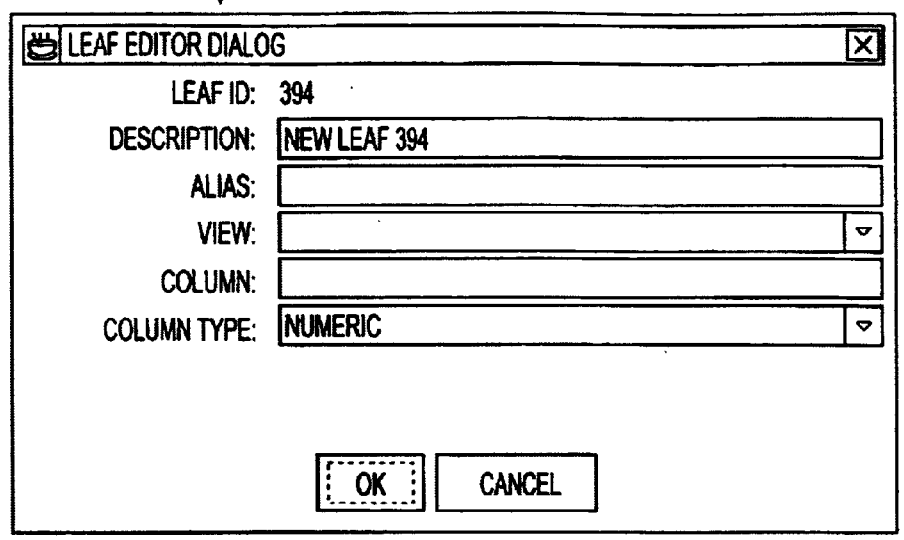
FIG. 16 is a screen shot illustrating an example of a display of a hierarchy editor with a leaf editor dialog box, in accordance with one embodiment of the present invention.

FIG. 16 illustrates a screen 1602 from hierarchy editor 1402 that illustrates how a "new leaf" or parameter may be added to hierarchy 1402.

Figure 17:
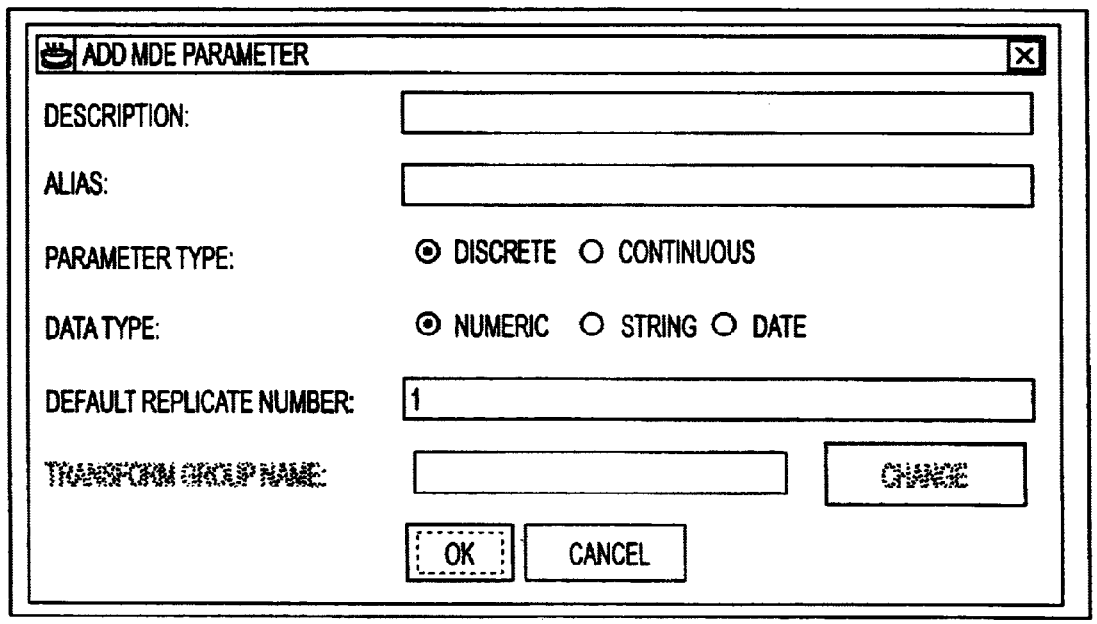
FIG. 17 is a screen shot illustrating an example of a display of a hierarchy editor with a dialog box for adding a parameter value, in accordance with one embodiment of the present invention.

FIG. 17 illustrates a screen 1702 used to add a "manual data entry leaf," a manually entered parameter, to hierarchy 1402 in preparation for adding new data.

Figure 18:
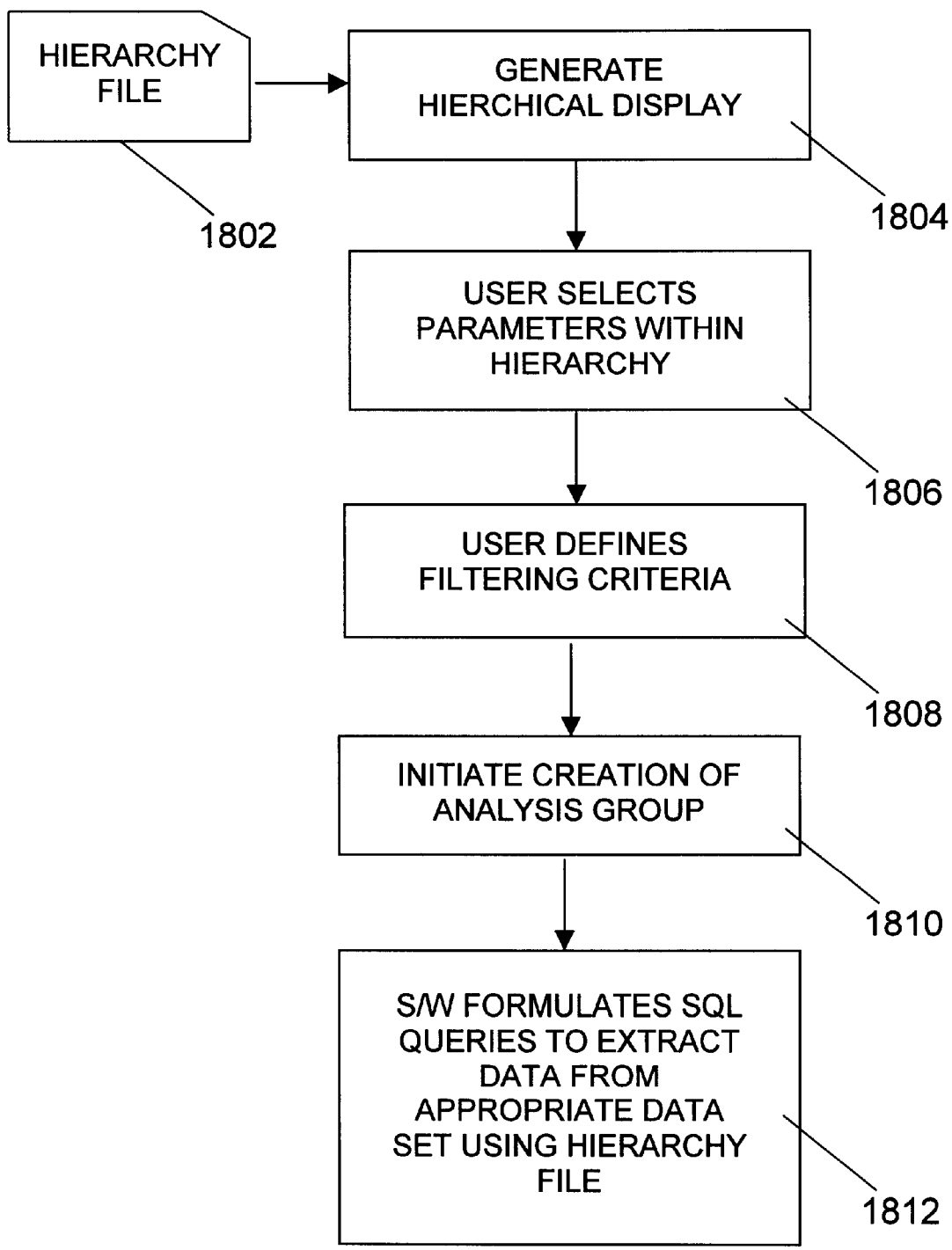
FIG. 18 illustrates one example of the logical operations for formulating an SQL query based upon a hierarchy, in accordance with one embodiment of the present invention.

FIG. 18 illustrates the logical operations performed by one embodiment of the present invention to formulate SQL queries using a hierarchy. Based on the contents of a hierarchy file 1802, at operation 1804, a hierarchical display is generated. At operation 1806, the user selects parameters within the hierarchy. At operation 1808, the user defines a filtering criterion. For example, the user may specify using only data from the batches from the third quarter of the fiscal year, wherein the yield was greater than fifty percent, and the raw materials supplier was as specified. In this example, the user-defined filtering criteria would be utilized by the software as data filters. At operation 1810, the user initiates creation of an analysis group, for example based on the parameters selected by the user at operation 1806 as filtered by the criteria defined by the user at operation 1808. In response to the user's initiation of the creation of an analysis group at operation 1810, at operation 1812 the software formulates the SQL queries to extract data from the appropriate database, using information from the hierarchy file. The SQL queries are created so that the analysis group contains the data as defined by the user-selected parameters of operation 1806 along with the user selected filtering criteria of operation 1808. In this manner, the method of the present invention may use a hierarchy and as a model of, for example, the manufacturing process and as a visual representation of this hierarchy as defined by the user.

Figure 19:
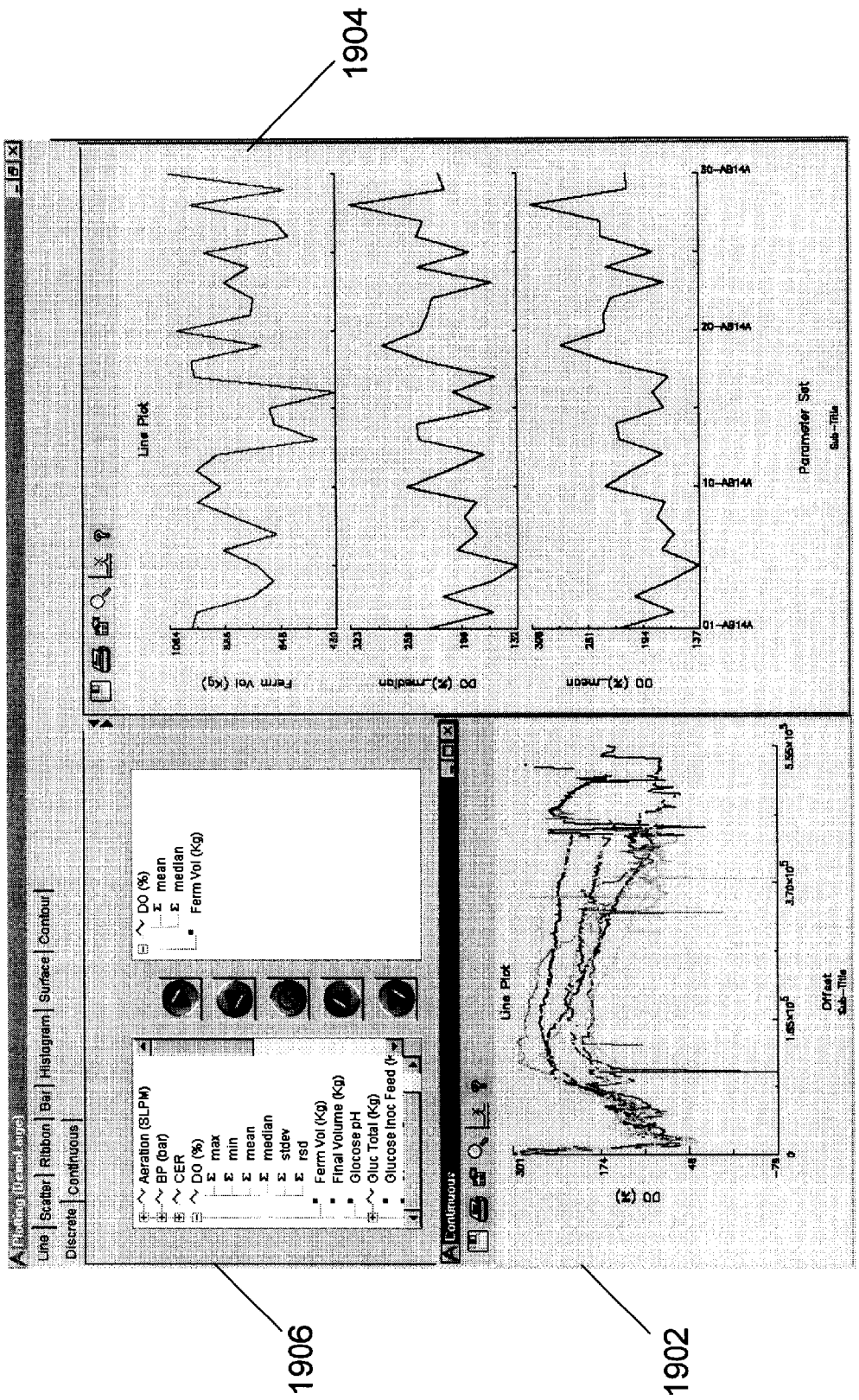
FIG. 19 is a screenshot illustrating discrete and continuous data displayed concurrently on a visual display device.

FIG. 19 is a screenshot showing continuous data 1902 and discrete data 1904 displayed simultaneously along with a hierarchy 1906 in which continuous data 1902 and discrete data 1904 is stored. Continuous data 1902 is a line plot showing the percentage of dissolved oxygen in a process over time for a 10 batches of product. Discrete data 1904 is a series of three line plots showing the volume of material in a fermenter, the median percentage of dissolved oxygen, and the mean percentage of dissolved oxygen in a process for 30 different batches of product. These three line plots are based on values for the data leaves DO (%) E mean E median and Ferm. Vol (kg) of hierarchy 1906.

FIGS. 20A, 20B, 20C, 20D, 20E and 20F illustrate a hierarchy of the present invention in the form of a spreadsheet. As shown in the Hierarchy Description section of the spreadsheet, the illustrated hierarchy has 8 levels. That is, a tree structure visually representing the illustrated hierarchy would have 8 levels. Rows 3, 4, 5 and 7 represent label nodes. Rows 6, 8, 19, 29 and 32 represent data nodes. Rows 9 through 18, 20 through 28, 30, 31, 33 and 34 represent data leaves. The column named "Alias" lists the unique identifier for each node or leaf of the hierarchy.

In the Data Location section of the spreadsheet of FIGS. 20A, 20B, 20C, 20D, 20E and 20F are the columns Label/Data, System, Table, Code Pair, First Code Column, First Code Value, Second Code Column, Second Code Value, Third Code Column, Third Code Value and Values. The column named Label/Data indicates whether the row represents a label node (Label) or a data node (Data) or data leaf (Data). The column named System indicates the logical name of the source of a data node or data leaf. For example, ERP (Enterprise Resource Planning), LIMS or PLC (Programmable Logic Controller). The column named Table indicates the specific table of a data source that contains a data node or data leaf. The column named Value Column indicates the column of the table of the data source that contains the restriction for a data node or the value of a data leaf. The column named Code Pair indicates the number of columns of data for a data leaf associated with a coded pair value. The column named First Code Column indicates the column in the table of the data source in which the first column of a coded pair is located. The column named First Code Value is the type of value in the first column of the coded pair. The column named Second Code Column indicates the column in the table of the data source that the second column of a coded pair is located. The column named Second Code Value is the type of value in the second column of the coded pair. The column named Third Code Column indicates the column in the table of the data source that the third column of a coded pair is located. The column named Third Code Value is the type of value in the third column of the coded pair. The column named Values indicates the restriction for a data node, the requirement that must be met by every data node or data leaf under that data node.

In the Data Description section of the spreadsheet of FIGS. 20A, 20B, 20C, 20D, 20E and 20F are the columns Data Type and Discrete/Continuous. The column named data type indicates the data type of data node or data leaf. Examples of data types are numbers, strings, dates, and other types of data conventionally found in databases. The column named Discrete/Continuous indicates whether a data node or data leaf is associated with discrete or continuous data.

Although particular columns are shown in the spreadsheet of FIGS. 20A, 20B, 20C, 20D, 20E and 20F, a spreadsheet used in creating a hierarchy or representing a hierarchy of the present invention may have fewer columns or additional columns depending on what is being analyzed using the hierarchy. For example, if there is no coded pair type data, then the columns relating to coded pairs may be eliminated, or more than 8 levels may be included in the hierarchy. Also, in a preferred embodiment a hierarchy of the present invention may include label nodes, or a hierarchy of the present invention may consist entirely of data nodes and data leaves.

As can be seen, the method of the present invention permits a user to flexibly access and analyze preexisting data sets from a variety of data sources, without having to manually locate, extract and format the data sets from these different sources.

The method of the present invention may be implemented as logical operations in a computing system. The logical operations of the present invention may be implemented (1) as a sequence of computing implemented steps running on the computing system and/or (2) as interconnected machine modules within the computing system. The implementation is a matter of choice dependent on the performance requirements of the computing system implementing the invention.

While the method disclosed herein has been described and shown with reference to particular steps performed in a particular order, it will be understood that these steps may be combined, sub-divided or re-ordered to form an equivalent method without departing from the teachings of the present invention. Accordingly, unless specifically indicated herein, the order and grouping of the steps is not a limitation of the present invention.

Within the context of the present invention, an analysis group is both a structure to collect and organize data, and a set of capabilities to make the analysis group extremely valuable to a user of the method of the present invention. For example, software employing the method of the present invention may include capabilities to allow an analysis group to be "refreshed", e.g. updated with potentially new information from one or more databases. An example of this would be if an end-user created an analysis group containing data from "last weeks manufacturing runs." Once a week had past, the end-user could "refresh" the analysis group, and get new data into it without re-defining the analysis group from scratch. The new data would result from the fact that a week has passed, and new data has been collected, and the definition of last week has changed.

The present invention also allows new "derived" parameters to be created within an analysis group. A derived parameter may be calculated using user-entered formulas and may be based on existing parameters within the analysis group. For example, a user could define a derived parameter that is the ratio of two existing parameters. Derived parameters may be re-calculated at any time, and may be updated when an analysis group is refreshed.

An analysis group of the present invention may include sub-sets or groupings of data. For example, a categorical parameter is defined by a series of conditions that define a specific value based on some other parameter in an analysis group. For example, if a user had a parameter that measured process yield, a user could define a categorical parameter that had values of "high", "medium" and "low" for yields that were above 80%, between 50% and 80%, and below 50% respectively. Many operations in software employing the method of the present invention may use categorical parameters to get at logical subsets of the data that a user has selected into an analysis group.

In addition, a user may edit parameter values within an analysis group, as well as delete parameters and parameter sets from an analysis group.

Although the present invention has been fully described in conjunction with processes in general and manufacturing processes in specific, it should be noted that the data mapping and hierarchical model can be used for non-process based data, such as financial data obtained from multiple disparate sources, inventory data from multiple sources used to track an analyze sales activity, etc.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for analyzing a process comprising;
providing at least one discrete data set comprising discrete data about at least one first step of said process;
providing at least one continuous data set comprising continuous data about at least one second step of said process;
grouping said discrete data and said continuous data into analysis group data based on at least one identification code and at least one parameter value of said discrete data and said continuous data; and
displaying displayed data on a visual display device about said process based on said analysis group data, wherein said displayed data is based on original data from at least two different data sources.

2. The method of claim 1, wherein said discrete data set comprises a coded-pair data set.

3. The method of claim 2, wherein said discrete data set comprises a horizontally replicate data set.

4. The method of claim 2, wherein said discrete data set comprises a vertically replicate data set.

5. The method of claim 2, wherein said discrete data set comprises a non-replicate data set.

6. The method of claim 1, wherein said discrete data set comprises a simple data set.

7. The method of claim 6, wherein said discrete data set comprises a horizontally replicate data set.

8. The method of claim 6, wherein said discrete data set comprises a vertically replicate data set.

9. The method of claim 6, wherein said discrete data set comprises a non-replicate data set.

10. The method of claim 1, wherein said continuous data set comprises a horizontally continuous data set.

11. The method of claim 10, wherein said continuous data set comprises a coded-pair data set.

12. The method of claim 10, wherein said continuous data set comprises a horizontally replicate data set.

13. The method of claim 10, wherein said continuous data set comprises a vertically replicate data set.

14. The method of claim 10, wherein said continuous data set comprises a non-replicate data set.

15. The method of claim 10, wherein said continuous data set comprises a simple data set.

16. The method of claim 15, wherein said continuous data set comprises a horizontally replicate data set.

17. The method of claim 15, wherein said continuous data set comprises a vertically replicate data set.

18. The method of claim 15, wherein said continuous data set comprises a non-replicate data set.

19. The method of claim 1, wherein said continuous data set comprises a vertically continuous data set.

20. The method of claim 19, wherein said continuous data set comprises a coded-pair data set.

21. The method of claim 19, wherein said continuous data set comprises a horizontally replicate data set.

22. The method of claim 19, wherein said continuous data set comprises a vertically replicate data set.

23. The method of claim 19, wherein said continuous data set comprises a non-replicate data set.

24. The method of claim 19, wherein said continuous data set comprises a simple data set.

25. The method of claim 24, wherein said continuous data set comprises a horizontally replicate data set.

26. The method of claim 24, wherein said continuous data set comprises a vertically replicate data set.

27. The method of claim 24, wherein said continuous data set comprises a non-replicate data set.

28. The method of claim 1, wherein said at least one discrete data set comprises a plurality of discrete data sets.

29. The method of claim 1, wherein said at least one continuous data set comprises a plurality of continuous data sets.

30. The method of claim 1, wherein said at least one first step comprises a plurality of steps.

31. The method of claim 1, wherein said at least one second step comprises a plurality of steps.

32. The method of claim 1, further comprising storing said discrete data set in a database.

33. The method of claim 1, further comprising storing said continuous data set in a database.

34. The method of claim 1, wherein said at least one parameter value comprises a plurality of parameter values.

35. The method of claim 1, wherein said at least two different data sources comprise at least two data sources having different file formats.

36. The method of claim 1, where in said at least two different data sources comprise at least two data sources having different data structures.

37. The method of claim 1, wherein said process comprises a manufacturing process.

38. The method of claim 1, wherein said process comprises a chemical synthesis process.

39. The method of claim 1, wherein said process comprises an inventory tracking process.

40. The method of claim 1, wherein said at least one parameter value comprises a plurality of parameter values.

41. The method of claim 1, wherein said at least one identification code comprises a plurality of identification codes.

42. The method of claim 41, wherein displayed data is organized based on said plurality of identification codes.

43. The method of claim 1, further comprising displaying selection parameters on said visual display device for being selected as said at least one parameter value, said selection parameters being organized in a hierarchical structure.

44. The method of claim 43, wherein said hierarchical structure is based on the organization of steps of said process.

45. The method of claim 43, wherein said hierarchical structure is based on raw materials used in said process.

46. The method of claim 43, wherein said hierarchical structure is based on equipment used in said process.

47. The method of claim 43, wherein said hierarchical structure is based on facilities or plant locations used in said process.

48. The method of claim 43, wherein said hierarchical structure is based on utilities used in said process.

49. The method of claim 43, wherein said hierarchical structure is based on crews of operators used in said process.

50. A machine readable medium having stored thereon sequences of instructions, which when executed by one or more processors, cause one or more electronic devices to perform a set of operations comprising:
providing at least one discrete data set comprising discrete data about at least one first step of said process;
providing at least one continuous data set comprising continuous data about at least one second step of said process;

grouping said discrete data and said continuous data into analysis group data based on at least one identification code and at least one parameter value of said discrete data and said continuous data; and displaying displayed data on a visual display device about said process based on said analysis group data, wherein said displayed data is based on original data from at least two different data sources.

51. The machine readable medium of claim 50, wherein said discrete data set comprises a coded-pair data set.

52. The machine readable medium of claim 51, wherein said discrete data set comprises a horizontally replicate data set.

53. The machine readable medium of claim 51, wherein said discrete data set comprises a vertically replicate data set.

54. The machine readable medium of claim 51, wherein said discrete data set comprises a non-replicate data set.

55. The machine readable medium of claim 50, wherein said discrete data set comprises a simple data set.

56. The machine readable medium of claim 55, wherein said discrete data set comprises a horizontally replicate data set.

57. The machine readable medium of claim 55, wherein said discrete data set comprises a vertically replicate data set.

58. The machine readable medium of claim 55, wherein said discrete data set comprises a non-replicate data set.

59. The machine readable medium of claim 50, wherein said continuous data set comprises a horizontally continuous data set.

60. The machine readable medium of claim 59, wherein said continuous data set comprises a coded-pair data set.

61. The machine readable medium of claim 59, wherein said continuous data set comprises a horizontally replicate data set.

62. The machine readable medium of claim 59, wherein said continuous data set comprises a vertically replicate data set.

63. The machine readable medium of claim 59, wherein said continuous data set comprises a non-replicate data set.

64. The machine readable medium of claim 59, wherein said continuous data set comprises a simple data set.

65. The machine readable medium of claim 64, wherein said continuous data set comprises a horizontally replicate data set.

66. The machine readable medium of claim 64, wherein said continuous data set comprises a vertically replicate data set.

67. The machine readable medium of claim 64, wherein said continuous data set comprises a non-replicate data set.

68. The machine readable medium of claim 50, wherein said continuous data set comprises a vertically continuous data set.

69. The machine readable medium of claim 68, wherein said continuous data set comprises a coded-pair data set.

70. The machine readable medium of claim 68, wherein said continuous data set comprises a horizontally replicate data set.

71. The machine readable medium of claim 68, wherein said continuous data set comprises a vertically replicate data set.

72. The machine readable medium of claim 68, wherein said continuous data set comprises a non-replicate data set.

73. The machine readable medium of claim 68, wherein said continuous data set comprises a simple data set.

74. The machine readable medium of claim 73, wherein said continuous data set comprises a horizontally replicate data set.

75. The machine readable medium of claim 73, wherein said continuous data set comprises a vertically replicate data set.

76. The machine readable medium of claim 73, wherein said continuous data set comprises a non-replicate data set.

77. The machine readable medium of claim 50, wherein said at least one discrete data set comprises a plurality of discrete data sets.

78. The machine readable medium of claim 50, wherein said at least one continuous data set comprises a plurality of continuous data sets.

79. The machine readable medium of claim 50, wherein said at least one first step comprises a plurality of steps.

80. The machine readable medium of claim 50, wherein said at least one second step comprises a plurality of steps.

81. The machine readable medium of claim 50, further comprising storing said discrete data set in a database.

82. The machine readable medium of claim 50, further comprising storing said continuous data set in a database.

83. The machine readable medium of claim 50, wherein said at least one parameter value comprises a plurality of parameter values.

84. The machine readable medium of claim 50, wherein said at least two different data sources comprise at least two data sources having different file formats.

85. The machine readable medium of claim 50, wherein said at least two different data sources comprise at least two data sources having different data structures.

86. The machine readable medium of claim 50, wherein said process comprises a manufacturing process.

87. The machine readable medium of claim 50, wherein said process comprises a chemical synthesis process.

88. The machine readable medium of claim 50, wherein said process comprises an inventory tracking process.

89. The machine readable medium of claim 50, wherein said at least one parameter value comprises a plurality of parameter values.

90. The machine readable medium of claim 50, wherein said at least one identification code comprises a plurality of identification codes.

91. The machine readable medium of claim 90, wherein displayed data is organized based on said plurality of identification codes.

92. The machine readable medium of claim 50, further comprising displaying selection parameters on said visual display device for being selected as said at least one parameter value, said selection parameters being organized in a hierarchical structure.

93. The machine readable medium of claim 92, wherein said hierarchical structure is based on the organization of steps of said process.

94. The machine readable medium of claim 92, wherein said hierarchical structure is based on raw materials used in said process.

95. The method of claim 92, wherein said hierarchical structure is based on equipment used in said process.

96. The method of claim 92, wherein said hierarchical structure is based on facilities or plant locations used in said process.

97. The method of claim 92, wherein said hierarchical structure is based on utilities used in said process.

98. The method of claim 92, wherein said hierarchical structure is based on crews of operators used in said process.

* * * * *